(12) United States Patent
Zhang

(10) Patent No.: US 10,517,129 B2
(45) Date of Patent: Dec. 24, 2019

(54) BLUETOOTH PAIRING METHOD AND BLUETOOTH DEVICE

(71) Applicant: HUAWEI TECHNOLOGIES CO., LTD., Shenzhen, Guangdong (CN)

(72) Inventor: Kang Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/327,696

(22) PCT Filed: Aug. 23, 2016

(86) PCT No.: PCT/CN2016/096349
§ 371 (c)(1),
(2) Date: Feb. 22, 2019

(87) PCT Pub. No.: WO2018/035709
PCT Pub. Date: Mar. 1, 2018

(65) Prior Publication Data
US 2019/0191473 A1 Jun. 20, 2019

(51) Int. Cl.
*H04W 76/10* (2018.01)
*H04W 4/80* (2018.01)
(Continued)

(52) U.S. Cl.
CPC .......... *H04W 76/14* (2018.02); *H04B 17/318* (2015.01); *H04W 4/80* (2018.02); *H04W 12/003* (2019.01); *H04W 84/18* (2013.01)

(58) Field of Classification Search
CPC ..... H04W 76/14; H04W 12/003; H04W 4/80; H04W 84/18; H04B 17/318
See application file for complete search history.

(56) References Cited

U.S. PATENT DOCUMENTS

| 2010/0120364 A1* | 5/2010 | Lee | H04W 8/005 455/41.2 |
| 2012/0156997 A1* | 6/2012 | Kim | H04W 8/005 455/41.2 |

(Continued)

FOREIGN PATENT DOCUMENTS

| CN | 103179168 A | 6/2013 |
| CN | 104184502 A | 12/2014 |

(Continued)

OTHER PUBLICATIONS

PCT International Search Report and Written Opinion issued in International Application No. PCT/CN2016/096349 dated May 2, 2017, 12 pages (with English translation).

*Primary Examiner* — Andrew Wendell
(74) *Attorney, Agent, or Firm* — Fish & Richardson P.C.

(57) ABSTRACT

The present disclosure relates to a Bluetooth pairing method and a Bluetooth device. One example method is applied to a first Bluetooth device, and the method includes: detecting a movement parameter of the first Bluetooth device during a movement; if the movement parameter meets a preset condition, enabling Bluetooth, and broadcasting a first query data packet to at least one Bluetooth device within an effective range; receiving a first query response data packet returned by the at least one Bluetooth device within the effective range; determining a to-be-paired Bluetooth device from the at least one Bluetooth device within the effective range based on first information included in the first query response data packet, where the first information includes at least one of first pairing indication information and RSSI information; and sending a pairing request to the to-be-paired Bluetooth device, to pair with the to-be-paired Bluetooth device.

20 Claims, 17 Drawing Sheets

(51) Int. Cl.
  *H04W 76/14*   (2018.01)
  *H04B 17/318*  (2015.01)
  *H04W 84/18*   (2009.01)
  *H04W 12/00*   (2009.01)

(56) References Cited

U.S. PATENT DOCUMENTS

| | | | |
|---|---|---|---|
| 2013/0165045 A1 | 6/2013 | Cao | |
| 2016/0037573 A1* | 2/2016 | Ko | H04W 76/14 455/41.2 |
| 2017/0244811 A1* | 8/2017 | McKenzie | H04W 76/14 |
| 2017/0289118 A1* | 10/2017 | Khosravi | H04L 63/107 |
| 2018/0098338 A1* | 4/2018 | Choi | H04W 4/00 |
| 2018/0338330 A1* | 11/2018 | Ledvina | H04W 8/005 |

FOREIGN PATENT DOCUMENTS

| | | |
|---|---|---|
| CN | 104540091 A | 4/2015 |
| CN | 104811869 A | 7/2015 |
| CN | 104967970 A | 10/2015 |
| CN | 105050049 A | 11/2015 |
| CN | 105703807 A | 6/2016 |

\* cited by examiner

Z-shaped moving track    O-shaped moving track

BLUETOOTH PAIRING METHOD AND BLUETOOTH DEVICE

This application is a National Stage of International Application No. PCT/CN2016/096349, filed on Aug. 23, 2016, which is hereby incorporated by reference in its entirety.

TECHNICAL FIELD

The present invention relates to the field of terminal technologies, and in particular, to a Bluetooth pairing method and a Bluetooth device.

BACKGROUND

Currently, to facilitate data transmission (for example, transmission of pictures, music, or other files) between user equipments (such as mobile phones, tablet computers, or wearable devices), many user equipments have a Bluetooth function.

In actual application, if a Bluetooth device A and a Bluetooth device B need to transmit data through Bluetooth, the Bluetooth device A and the Bluetooth device B need to be paired first. After the Bluetooth device A and the Bluetooth device B are paired, a connection can be established between the Bluetooth device A and the Bluetooth device B, and data transmission is performed. In actual application, a process of pairing the Bluetooth device A and the Bluetooth device B by users may include the following steps:

1. A user A taps to display a Bluetooth setting interface of the Bluetooth device A, and taps on the Bluetooth setting interface to enable Bluetooth.

2. A user B taps to display a Bluetooth setting interface of the Bluetooth device B, enables Bluetooth on the Bluetooth setting interface, and sets a state of the Bluetooth device B to a visible state on the Bluetooth setting interface, so that the Bluetooth device B can be scanned by all nearby Bluetooth devices.

3. The user A taps a scan button on the Bluetooth setting interface of the Bluetooth device A, to enable the Bluetooth device A to scan for nearby Bluetooth devices.

4. After the Bluetooth device B is scanned by the Bluetooth device A, the user A selects the Bluetooth device B on the Bluetooth device A, and enables the Bluetooth device A to initiate a pairing request to the Bluetooth device B.

5. After receiving the pairing request, the Bluetooth device B outputs prompt information for asking the user whether to pair with the Bluetooth device A.

6. The user B taps a pairing confirmation button on the Bluetooth device B, so that the Bluetooth device B is successfully paired with the Bluetooth device A.

It can be learned that the foregoing Bluetooth device pairing process is quite complex, and convenience and efficiency of Bluetooth device pairing are relatively poor.

SUMMARY

Embodiments of the present invention disclose a Bluetooth pairing method and a Bluetooth device, to improve convenience and pairing efficiency of Bluetooth pairing.

According to a first aspect, an embodiment of the present invention provides a Bluetooth pairing method, applied to a first Bluetooth device, where the method includes: detecting, by the first Bluetooth device, a movement parameter of the first Bluetooth device during a movement; if the movement parameter meets a preset condition, enabling, by the first Bluetooth device, Bluetooth, and broadcasting a first query data packet to at least one Bluetooth device within an effective range; receiving, by the first Bluetooth device, a first query response data packet returned by the at least one Bluetooth device within the effective range; determining, by the first Bluetooth device, a to-be-paired Bluetooth device from the at least one Bluetooth device within the effective range based on first information included in the first query response data packet, where the first information includes at least one of first pairing indication information and RSSI information, and the first pairing indication information is used to indicate that the at least one Bluetooth device within the effective range performs Bluetooth pairing by performing a preset movement; and sending, by the first Bluetooth device, a pairing request to the to-be-paired Bluetooth device, to pair with the to-be-paired Bluetooth device.

It can be learned that, after the method provided in the first aspect is implemented, if a user wants to pair the first Bluetooth device with a Bluetooth device within the effective range, the user only needs to hold the first Bluetooth device to perform a preset movement, so that the first Bluetooth device can be automatically paired with the Bluetooth device within the effective range, pairing the first Bluetooth device quickly and conveniently.

In a possible implementation, the movement parameter detected by the first Bluetooth device may be any one or any combination of a moving track, a movement speed (which may be an average movement speed), a movement acceleration (which may be an average movement acceleration), and the like.

In a possible implementation, when the movement parameter detected by the first Bluetooth device is the moving track, a specific implementation of detecting, by the first Bluetooth device, whether the movement parameter meets the preset condition may be: detecting, by the first Bluetooth device, whether the moving track matches a preset track of the first Bluetooth device. If the moving track matches the preset track of the first Bluetooth device, the first Bluetooth device enables Bluetooth, and broadcasts the first query data packet to the at least one Bluetooth device within the effective range.

In a possible implementation, when the movement parameter detected by the first Bluetooth device is the movement speed, a specific implementation of detecting, by the first Bluetooth device, whether the movement parameter meets the preset condition may be: detecting, by the first Bluetooth device, whether the movement speed is greater than a preset speed of the first Bluetooth device. If the movement speed is greater than the preset speed of the first Bluetooth device, the first Bluetooth device enables Bluetooth, and broadcasts the first query data packet to the at least one Bluetooth device within the effective range.

In a possible implementation, when the movement parameter detected by the first Bluetooth device is the movement acceleration, a specific implementation of detecting, by the first Bluetooth device, whether the movement parameter meets the preset condition may be: detecting, by the first Bluetooth device, whether the movement acceleration is greater than a preset acceleration of the first Bluetooth device. If the movement acceleration is greater than the preset acceleration of the first Bluetooth device, the first Bluetooth device enables Bluetooth, and broadcasts the first query data packet to the at least one Bluetooth device within the effective range.

In a possible implementation, the first information includes the first pairing indication information, and the determining, by the first Bluetooth device, a to-be-paired Bluetooth device from the at least one Bluetooth device within the effective range based on first information included in the first query response data packet includes: determining, by the first Bluetooth device from the at least one Bluetooth device within the effective range, a Bluetooth device that returns a first query response data packet including the first pairing indication information as the to-be-paired Bluetooth device.

It can be learned that, after this implementation is implemented, if a user wants to pair the first Bluetooth device with a second Bluetooth device within the effective range, the user only needs to hold the first Bluetooth device and the second Bluetooth device to perform preset movements, so that the first Bluetooth device can be automatically paired with the second Bluetooth device, pairing the first Bluetooth device with the second Bluetooth device quickly and conveniently.

In a possible implementation, the first information includes the RSSI information, and the determining, by the first Bluetooth device, a to-be-paired Bluetooth device from the at least one Bluetooth device within the effective range based on first information included in the first query response data packet includes: determining, by the first Bluetooth device from the at least one Bluetooth device within the effective range, a Bluetooth device nearest to the first Bluetooth device as the to-be-paired Bluetooth device based on the RSSI information included in the first query response data packet.

It can be learned that, after this implementation is implemented, if a user wants to pair the first Bluetooth device with a second Bluetooth device within the effective range, the user only needs to place the first Bluetooth device close to the second Bluetooth device, and hold the first Bluetooth device to perform a preset movement, so that the first Bluetooth device can be automatically paired with the second Bluetooth device, pairing the first Bluetooth device with the second Bluetooth device quickly and conveniently.

In a possible implementation, the first information includes the RSSI information, and the determining, by the first Bluetooth device, a to-be-paired Bluetooth device from the at least one Bluetooth device within the effective range based on first information included in the first query response data packet includes: determining, by the first Bluetooth device from the at least one Bluetooth device within the effective range, a Bluetooth device within a preset distance from the first Bluetooth device as the to-be-paired Bluetooth device based on the RSSI information included in the first query response data packet.

It can be learned that, after this implementation is implemented, if a user wants to pair the first Bluetooth device with a second Bluetooth device within the effective range, the user only needs to place the first Bluetooth device close to the second Bluetooth device, and hold the first Bluetooth device to perform a preset movement, so that the first Bluetooth device can be automatically paired with the second Bluetooth device, pairing the first Bluetooth device with the second Bluetooth device quickly and conveniently.

In a possible implementation, the first information includes the first pairing indication information and the RSSI information, and the determining, by the first Bluetooth device, a to-be-paired Bluetooth device from the at least one Bluetooth device within the effective range based on first information included in the first query response data packet includes: determining, by the first Bluetooth device from the at least one Bluetooth device within the effective range, a target Bluetooth device that returns a first query response data packet including the first pairing indication information; and if there are a plurality of target Bluetooth devices, determining, by the first Bluetooth device from the target Bluetooth devices, a Bluetooth device nearest to the first Bluetooth device as the to-be-paired Bluetooth device based on the RSSI information included in the first query response data packets returned by the target Bluetooth devices; or if there are a plurality of target Bluetooth devices, determining, by the first Bluetooth device from the target Bluetooth devices, a Bluetooth device within a preset distance from the first Bluetooth device as the to-be-paired Bluetooth device based on the RSSI information included in the first query response data packets returned by the target Bluetooth devices.

It can be learned that, after this implementation is implemented, if a user wants to pair the first Bluetooth device with a second Bluetooth device within the effective range, the user only needs to place the first Bluetooth device close to the second Bluetooth device, and hold the first Bluetooth device and the second Bluetooth device to perform preset movements, so that the first Bluetooth device can be automatically and accurately paired with the second Bluetooth device, pairing the first Bluetooth device with the second Bluetooth device quickly and conveniently.

In a possible implementation, the first information includes the first pairing indication information, and the first information further includes second movement time information; the first Bluetooth device may further detect first movement time information of the first Bluetooth device during the movement; and the determining, by the first Bluetooth device, a to-be-paired Bluetooth device from the at least one Bluetooth device within the effective range based on first information included in the first query response data packet includes: determining, by the first Bluetooth device from the at least one Bluetooth device within the effective range, a target Bluetooth device that returns a first query response data packet including the first pairing indication information; and if there are a plurality of target Bluetooth devices, determining, by the first Bluetooth device from the target Bluetooth devices based on the first movement time information and the second movement time information, a Bluetooth device that returns second movement time information having a smallest time difference from the first movement time information as the to-be-paired Bluetooth device.

It can be learned that, after this implementation is implemented, if a user wants to pair the first Bluetooth device with a second Bluetooth device within the effective range, the user only needs to hold the first Bluetooth device and the second Bluetooth device to perform preset movements at a same time (or at similar times), so that the first Bluetooth device can be automatically paired with the second Bluetooth device, pairing the first Bluetooth device with the second Bluetooth device quickly and conveniently.

In a possible implementation, after the first Bluetooth device detects that the movement parameter matches a preset parameter, and before the first Bluetooth device broadcasts the first query data packet to the at least one Bluetooth device within the effective range, the first Bluetooth device further enables a visible mode; and correspondingly, after the first Bluetooth device receives a second query data packet broadcast by the at least one Bluetooth device within the effective range, the first Bluetooth device returns a second query response data packet to the at least one Bluetooth device within the effective range, where the second query response data packet includes at least one of second pairing indication information and RSSI information, and the second pairing indication information is used to indicate that the first Bluetooth device performs Bluetooth pairing by performing a preset movement; and the sending, by the first Bluetooth device, a pairing request to the to-be-paired Bluetooth device includes: if no pairing request sent by the to-be-paired Bluetooth device is received, sending, by the first Bluetooth device, the pairing request to the to-be-paired Bluetooth device.

After this implementation is implemented, the first Bluetooth device can proactively search for nearby Bluetooth devices for pairing and can be found by the nearby Bluetooth devices. Therefore, if two first Bluetooth devices need to be paired, a user only needs to hold the two first Bluetooth devices to perform preset movements, so that the two first Bluetooth devices can be found by each other, and the two first Bluetooth devices can be automatically and accurately paired, pairing the first Bluetooth devices quickly and conveniently.

According to a second aspect, an embodiment of the present invention further provides a Bluetooth pairing method, applied to a second Bluetooth device, where the method includes: detecting, by the second Bluetooth device, a movement parameter of the second Bluetooth device during a movement; if the movement parameter meets a preset condition, enabling, by the second Bluetooth device, Bluetooth, and entering a visible state; after receiving, by the second Bluetooth device, a query data packet broadcast by at least one Bluetooth device within an effective range, returning, by the second Bluetooth device, a query response data packet to the at least one Bluetooth device within the effective range, where the query response data packet includes at least one of pairing indication information and RSSI information, and the pairing indication information is used to indicate that the second Bluetooth device performs Bluetooth pairing by performing a preset movement; and after receiving, by the second Bluetooth device, a pairing request sent by the at least one Bluetooth device within the effective range, confirming, by the second Bluetooth device, pairing with the at least one Bluetooth device within the effective range.

It can be learned that, after the method provided in the second aspect is implemented, if a user wants to pair the second Bluetooth device with a Bluetooth device within the effective range, the user only needs to hold the second Bluetooth device to perform a preset movement, so that the second Bluetooth device can be automatically paired with the Bluetooth device within the effective range, pairing the first Bluetooth device quickly and conveniently.

In a possible implementation, the movement parameter detected by the second Bluetooth device may also be any one or any combination of a moving track, a movement speed (which may be an average movement speed), a movement acceleration (which may be an average movement acceleration), and the like.

In a possible implementation, when the movement parameter detected by the second Bluetooth device is the moving track, a specific implementation of detecting, by the second Bluetooth device, whether the movement parameter meets the preset condition may be: detecting, by the second Bluetooth device, whether the moving track matches a preset track of the second Bluetooth device. If the moving track matches the preset track of the second Bluetooth device, the second Bluetooth device enables Bluetooth and enters the visible state.

In a possible implementation, when the movement parameter detected by the second Bluetooth device is the movement speed, a specific implementation of detecting, by the second Bluetooth device, whether the movement parameter meets the preset condition may be: detecting, by the second Bluetooth device, whether the movement speed is greater than a preset speed of the second Bluetooth device. If the movement speed is greater than the preset speed of the second Bluetooth device, the second Bluetooth device enables Bluetooth and enters the visible state.

In a possible implementation, when the movement parameter detected by the second Bluetooth device is the movement acceleration, a specific implementation of detecting, by the second Bluetooth device, whether the movement parameter meets the preset condition may be: detecting, by the second Bluetooth device, whether the movement acceleration is greater than a preset acceleration of the second Bluetooth device. If the movement acceleration is greater than the preset acceleration of the second Bluetooth device, the second Bluetooth device enables Bluetooth and enters the visible state.

In a possible implementation, the second Bluetooth device may further detect movement time information of the second Bluetooth device during the movement; and the query response data packet further includes the movement time information.

The at least one Bluetooth device within the effective range of the second Bluetooth device may determine a to-be-paired device based on the movement time information. It can be learned that, after this implementation is implemented, if a user wants to pair the second Bluetooth device with a first Bluetooth device within the effective range, the user only needs to hold the second Bluetooth device and the first Bluetooth device to perform preset movements at a same time (or at similar times), so that the first Bluetooth device can be automatically paired with the second Bluetooth device, pairing the first Bluetooth device with the second Bluetooth device quickly and conveniently.

According to a third aspect, an embodiment of the present invention provides a Bluetooth device. The Bluetooth device has a function of implementing actions of the first Bluetooth device in the first aspect or the possible implementations of the first aspect. The function may be implemented by using hardware or by executing corresponding software by hardware. The hardware or software includes one or more units corresponding to the function. The unit may be software and/or hardware.

According to a fourth aspect, an embodiment of the present invention provides a Bluetooth device. The Bluetooth device includes one or more processors, a Bluetooth module, a memory, a sensor, a bus, and one or more programs, and the Bluetooth module, the memory, and the sensor are connected to the processor by using the bus. The one or more programs are stored in the memory, and the one or more programs include an instruction. When the instruction is executed by the Bluetooth device, the Bluetooth device executes the first aspect or the possible implementations of the first aspect.

According to a fifth aspect, an embodiment of the present invention provides a computer-readable storage medium storing one or more programs. The one or more programs include an instruction, and the instruction is used to execute the first aspect or the possible implementations of the first aspect.

According to a sixth aspect, an embodiment of the present invention provides a Bluetooth device. The Bluetooth device has a function of implementing actions of the second Bluetooth device in the second aspect or the possible implementations of the second aspect. The function may be implemented by using hardware or by executing corresponding software by hardware. The hardware or software includes one or more units corresponding to the function. The unit may be software and/or hardware.

According to a seventh aspect, an embodiment of the present invention provides a Bluetooth device. The Bluetooth device includes one or more processors, a Bluetooth module, a memory, a sensor, a bus, and one or more programs, and the Bluetooth module, the memory, and the sensor are connected to the processor by using the bus. The one or more programs are stored in the memory, and the one or more programs include an instruction. When the instruction is executed by the Bluetooth device, the Bluetooth device executes the second aspect or the possible implementations of the second aspect.

According to an eighth aspect, an embodiment of the present invention provides a computer-readable storage medium storing one or more programs. The one or more programs include an instruction, and the instruction is used to execute the second aspect or the possible implementations of the second aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following describes the technical solutions of the embodiments of the present invention with reference to the accompanying drawings.

To resolve s problem of relatively poor convenience and efficiency of Bluetooth device pairing described in the background, the embodiments of the present invention provide a Bluetooth pairing method and a Bluetooth device. The Bluetooth device provided in the embodiments of the present invention may be a mobile device, for example, may be a mobile phone, a tablet computer, a portable Bluetooth speaker, a smartwatch, or a Bluetooth headset.

To facilitate understanding of the Bluetooth pairing method and the Bluetooth device provided in the embodiments of the present invention, the following describes, based on specific application scenarios, the Bluetooth pairing method and the Bluetooth device provided in the embodiments of the present invention in detail. It can be understood that the application scenarios described in the embodiments of the present invention are intended to describe the technical solutions in the embodiments of the present invention more clearly, and do not constitute limitations to the technical solutions in the embodiments of the present invention.

Figure 1:
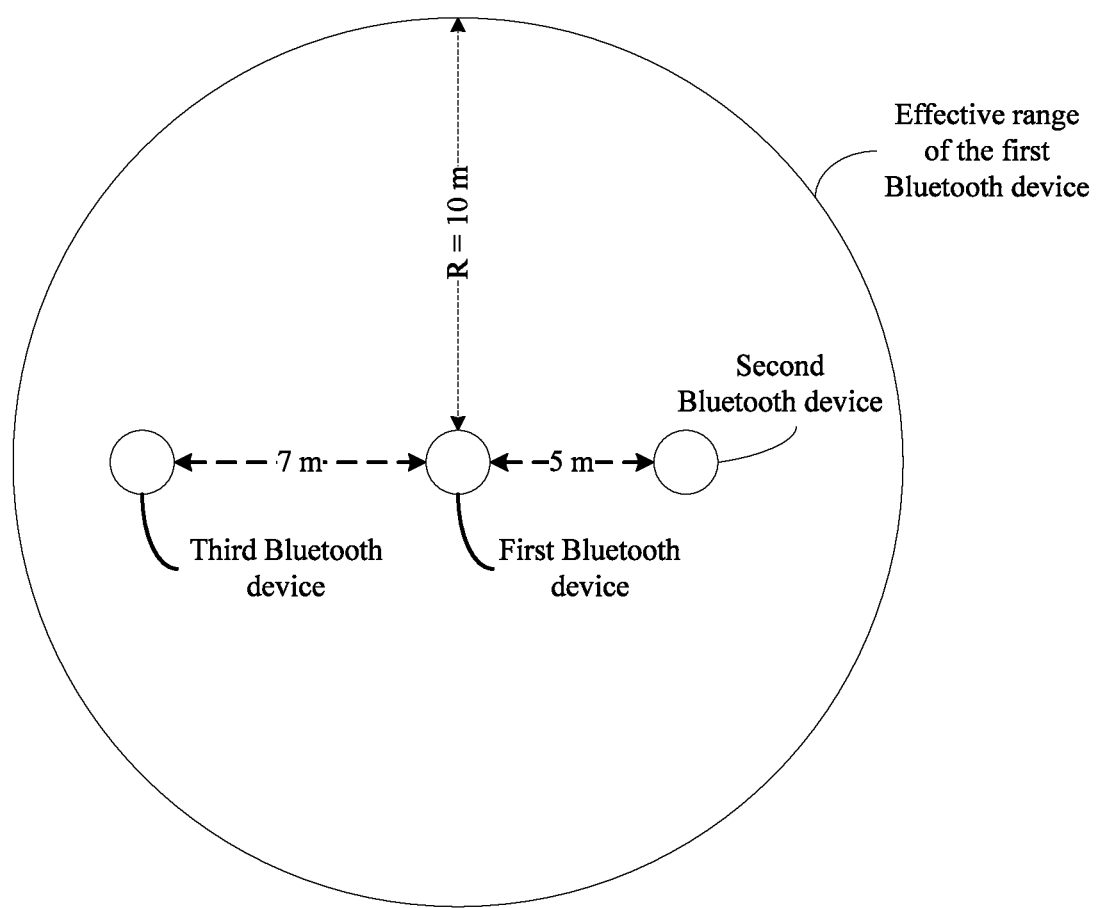
FIG. 1 is a schematic diagram of an application scenario according to an embodiment of the present invention.

FIG. 1 is a schematic diagram of an application scenario according to an embodiment of the present invention. As shown in FIG. 1, the application scenario includes three Bluetooth devices: a first Bluetooth device, a second Bluetooth device, and a third Bluetooth device. The second Bluetooth device and the third Bluetooth device are located in an effective range (for example, the effective range may be a circle that centers on the first Bluetooth device and has a 10-meter R (radius)) of the first Bluetooth device. A distance between the first Bluetooth device and the third Bluetooth device is 7 meters, and a distance between the first Bluetooth device and the second Bluetooth device is 5 meters.

Figure 2:
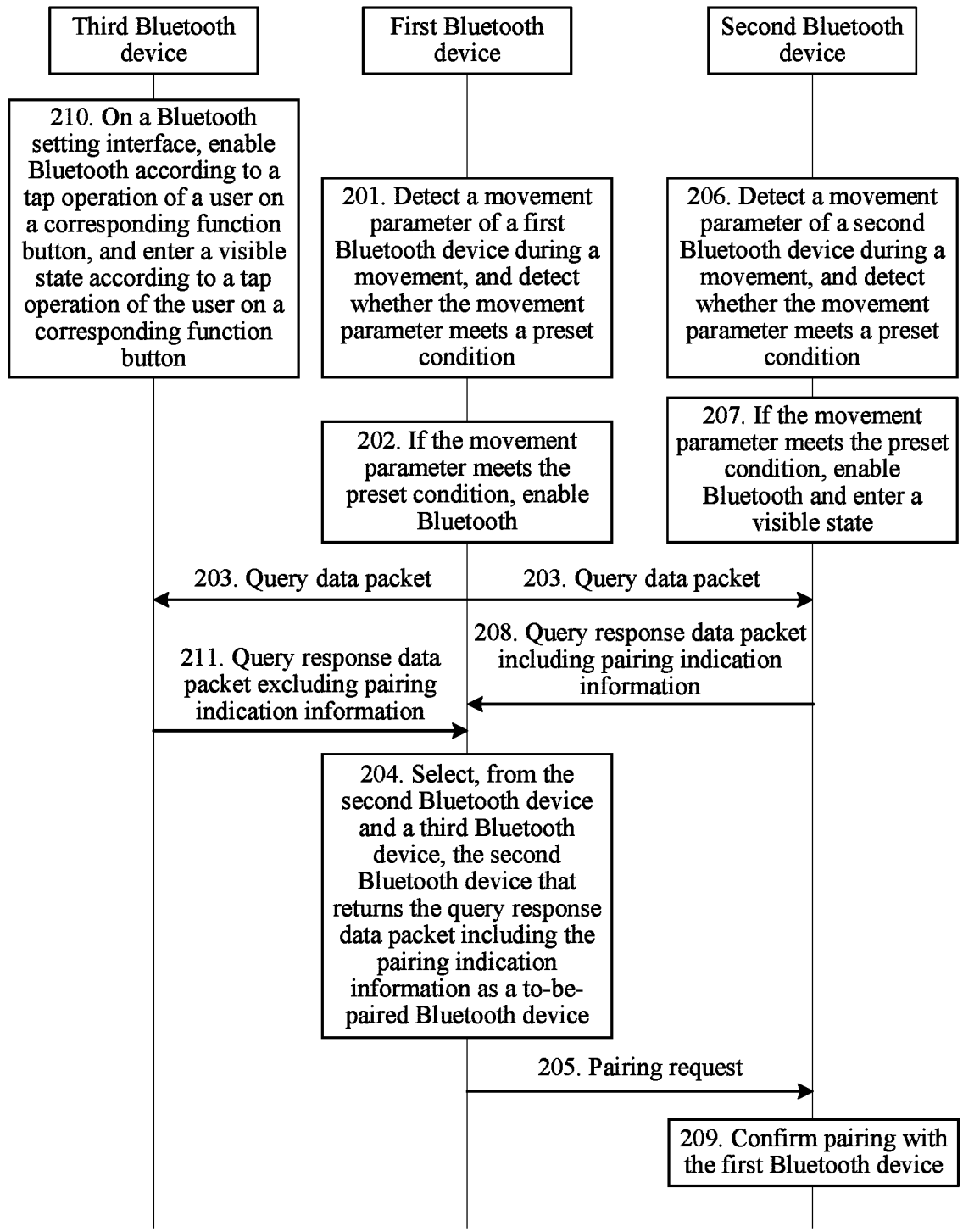
FIG. 2 is a schematic flowchart of a Bluetooth pairing method according to an embodiment of the present invention.

Based on the application scenario shown in FIG. 1, referring to FIG. 2, FIG. 2 is a schematic flowchart of a Bluetooth pairing method according to an embodiment of the present invention.

As shown in FIG. 2, the first Bluetooth device may perform parts 201 to 205. In part 201, the first Bluetooth device detects a movement parameter of the first Bluetooth device during a movement, and detects whether the movement parameter meets a preset condition. If the movement parameter meets the preset condition, part 202 is performed. That is, the first Bluetooth device enables Bluetooth.

In an optional implementation, the movement parameter detected by the first Bluetooth device may be any one or any combination of a moving track, a movement speed (which may be an average movement speed), a movement acceleration (which may be an average movement acceleration), and the like.

Figure 3:
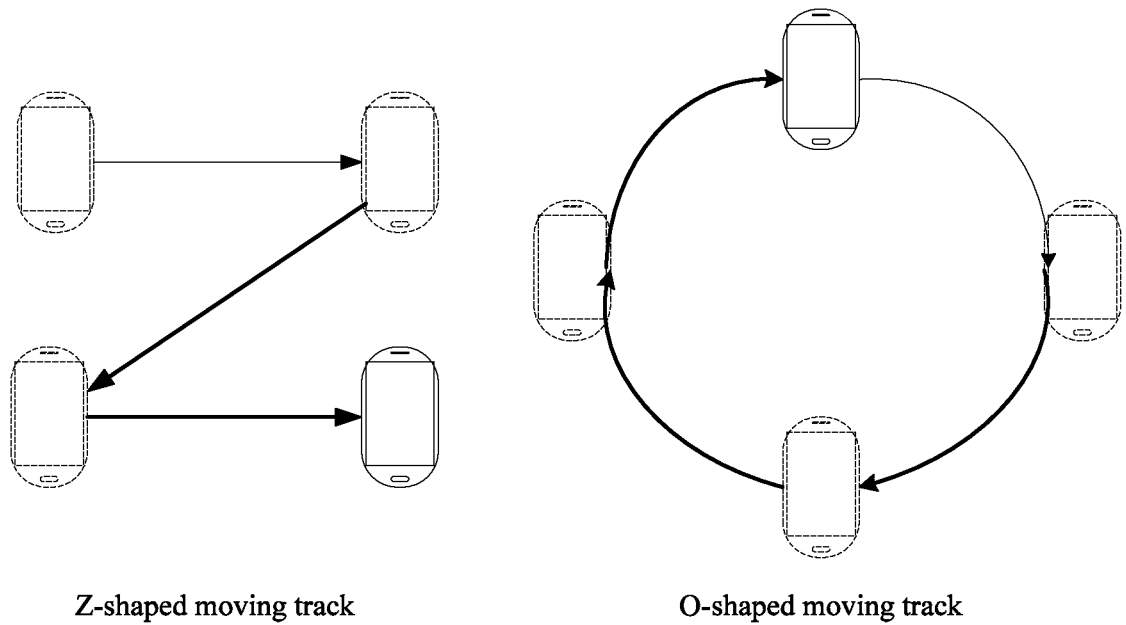
FIG. 3 is a schematic diagram of a moving track according to an embodiment of the present invention.

In an optional implementation, when the movement parameter detected by the first Bluetooth device is the moving track, a specific implementation of detecting, by the first Bluetooth device, whether the movement parameter meets the preset condition may be: detecting, by the first Bluetooth device, whether the moving track matches a preset track of the first Bluetooth device. If the moving track matches the preset track of the first Bluetooth device, part 202 is performed. For example, if the preset track is Z-shaped, a user may hold the first Bluetooth device to perform a movement in a Z-shaped track shown in FIG. 3; if the preset track is O-shaped, the user may hold the first Bluetooth device to perform a movement in an O-shaped track shown in FIG. 3.

In an optional implementation, when the movement parameter detected by the first Bluetooth device is the movement speed, a specific implementation of detecting, by the first Bluetooth device, whether the movement parameter meets the preset condition may be: detecting, by the first Bluetooth device, whether the movement speed is greater than a preset speed of the first Bluetooth device. If the movement speed is greater than the preset speed of the first Bluetooth device, part 202 is performed.

In an optional implementation, when the movement parameter detected by the first Bluetooth device is the movement acceleration, a specific implementation of detecting, by the first Bluetooth device, whether the movement parameter meets the preset condition may be: detecting, by the first Bluetooth device, whether the movement acceleration is greater than a preset acceleration of the first Bluetooth device. If the movement acceleration is greater than the preset acceleration of the first Bluetooth device, part 202 is performed.

As shown in FIG. 2, the second Bluetooth device may perform parts 206 to 209. In part 206, the second Bluetooth device detects whether a movement parameter of the second Bluetooth device during a movement meets a preset condition. If the movement parameter meets the preset condition, part 207 is performed. That is, the second Bluetooth device enables Bluetooth, and enters a visible state (namely, an Inquiry Scan state). After receiving, in the visible state, a query data packet broadcast by the first Bluetooth device, the second Bluetooth device performs part 208, that is, returns a query response data packet (namely, an Inquiry Response data packet) to the first Bluetooth device. The query response data packet includes pairing indication information. The second Bluetooth device returns, only in the visible state, the query response data packet to the first Bluetooth device. After receiving the query response data packet returned by the second Bluetooth device, the first Bluetooth device finds the second Bluetooth device.

The query response data packet includes a basic query response data packet and an extended query response data packet. The pairing indication information is included in the extended query response data packet. The pairing indication information is used to indicate to the first Bluetooth device that the second Bluetooth device performs Bluetooth pairing by performing a preset movement (namely, a movement whose movement parameter meets the preset condition).

Figure 4:
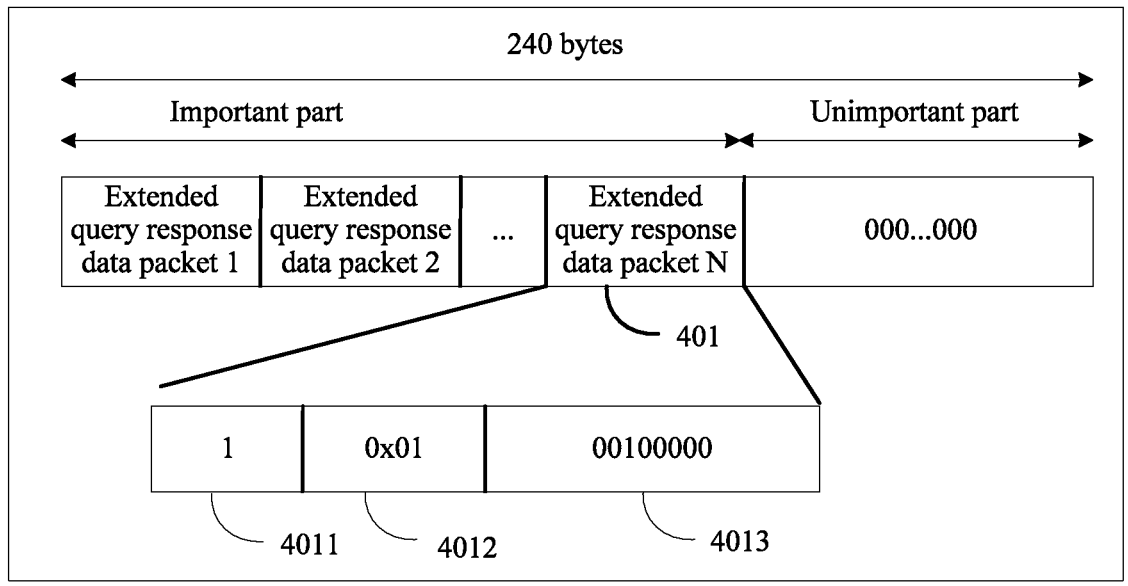
FIG. 4 is a schematic diagram of a format of an extended query response data packet according to an embodiment of the present invention.

FIG. 4 is a schematic diagram of a format of the extended query response data packet. As shown in FIG. 4, one query response data packet may include a plurality of extended query response data packets, and the extended query response data packets include a total of 240 bytes. Some extended query response data packets are important, and some extended query response data packets are not important. The pairing indication information may be included in any one or more of the important extended query response data packets. Each important extended query response data packet includes a length field, a data type field, and a data field. An extended query response data packet N 401 is used as an example in FIG. 4, and the extended query response data packet N 401 includes a length field 4011, a data type field 4012, and a data field 4013. A value of the length field 4011 is used to indicate a length of the extended query response data packet N 401. A value of the data type field 4012 is used to indicate a data type of the extended query response data packet N. The data field 4013 is used to store specified data. For a detailed introduction to the data format of the extended query response data packet, refer to a Bluetooth protocol specification, such as the Bluetooth Core Specification Version 4.0. Details are not described herein.

For example, the pairing indication information may be included in the extended query response data packet N 401. As shown in FIG. 4, in "00100000", right-side four digits have an industry-specific meaning, and a fifth digit from right to left may be used to store the pairing indication information. In "00100000" in FIG. 4, the fifth digit from right to left is 0. In other words, 0 is the pairing indication information.

In an optional implementation, the movement parameter detected by the second Bluetooth device may also be any one or any combination of a moving track, a movement speed (which may be an average movement speed), a movement acceleration (which may be an average movement acceleration), and the like.

In an optional implementation, when the movement parameter detected by the second Bluetooth device is the moving track, a specific implementation of detecting, by the second Bluetooth device, whether the movement parameter meets the preset condition may be: detecting, by the second Bluetooth device, whether the moving track matches a preset track of the second Bluetooth device. If the moving track matches the preset track of the second Bluetooth device, part 207 is performed.

In an optional implementation, when the movement parameter detected by the second Bluetooth device is the movement speed, a specific implementation of detecting, by the second Bluetooth device, whether the movement parameter meets the preset condition may be: detecting, by the second Bluetooth device, whether the movement speed is greater than a preset speed of the second Bluetooth device. If the movement speed is greater than the preset speed of the second Bluetooth device, part 207 is performed.

In an optional implementation, when the movement parameter detected by the second Bluetooth device is the movement acceleration, a specific implementation of detecting, by the second Bluetooth device, whether the movement parameter meets the preset condition may be: detecting, by the second Bluetooth device, whether the movement acceleration is greater than a preset acceleration of the second Bluetooth device. If the movement acceleration is greater than the preset acceleration of the second Bluetooth device, part 207 is performed.

In an optional implementation, preset parameters (that is, the preset tracks, the preset speeds, or the preset accelerations) of the first Bluetooth device and the second Bluetooth device may be set by the user on the first Bluetooth device and the second Bluetooth device, respectively. For example, the user may tap, on the first Bluetooth device, a function button for setting a preset track, and after the user taps the function button for setting a preset track, the user may hold the first Bluetooth device to perform a movement. The first Bluetooth device records a moving track of the first Bluetooth device, and sets the moving track corresponding to the movement as the preset track after the first Bluetooth device stops moving. Alternatively, the preset parameter may be set by a manufacturer that produces the first Bluetooth device.

In an optional implementation, a preset parameter of the first Bluetooth device may be the same as a preset parameter of the second Bluetooth device, or may be different from a preset parameter of the second Bluetooth device. For example, the preset parameter of the first Bluetooth device may be a Z-shaped track, and the preset parameter of the second Bluetooth device may be an S-shaped track. That is, if the first Bluetooth device is a device of a user A, and the second Bluetooth device is a device of a user B, the user A may set a favorite track for quick Bluetooth pairing, and the user B may also set a favorite track for quick Bluetooth pairing.

As shown in FIG. 2, the third Bluetooth device may perform parts 210 and 211. The third Bluetooth device enters a visible state after the user manually taps a function button on the Bluetooth device. After receiving, in the visible state, the query data packet broadcast by the first Bluetooth device, the third Bluetooth device returns a query response data packet to the first Bluetooth device. The query response data packet does not include pairing indication information.

As shown in part 204 of FIG. 2, after receiving the query response data packets returned by the second Bluetooth device and the third Bluetooth device, the first Bluetooth device selects, from the second Bluetooth device and the third Bluetooth device, a device that returns the query response data packet including the pairing indication information as a to-be-paired Bluetooth device. Because only the query response data packet returned by the second Bluetooth device includes the pairing indication information, the first Bluetooth device determines the second Bluetooth device as the to-be-paired Bluetooth device.

As shown in part 205 of FIG. 2, after determining the second Bluetooth device as the to-be-paired Bluetooth device, the first Bluetooth device sends a pairing request to the second Bluetooth device. As shown in part 209 of FIG. 2, after receiving the pairing request sent by the first Bluetooth device, the second Bluetooth device automatically confirms pairing with the first Bluetooth device.

In an optional implementation, if the first Bluetooth device has not received a query response data packet returned by any Bluetooth device within the effective range in a preset time period, the first Bluetooth device disables Bluetooth. This helps save power of the first Bluetooth device.

It can be learned that, after the method, the first Bluetooth device, and the second Bluetooth device shown in FIG. 2 are implemented, the user does not need to perform the following operations: manually tapping screens of the first Bluetooth device and the second Bluetooth device to display Bluetooth pairing interfaces, manually searching for Bluetooth devices around the first Bluetooth device, and manually selecting the found second Bluetooth device for pairing. After the method, the first Bluetooth device, and the second Bluetooth device shown in FIG. 2 are implemented, if the user wants to pair the first Bluetooth device with the second Bluetooth device, the user only needs to hold the first Bluetooth device to perform a preset movement, and hold the second Bluetooth device to perform a preset movement, so that the first Bluetooth device and the second Bluetooth device can be paired quickly and conveniently.

Figure 5:
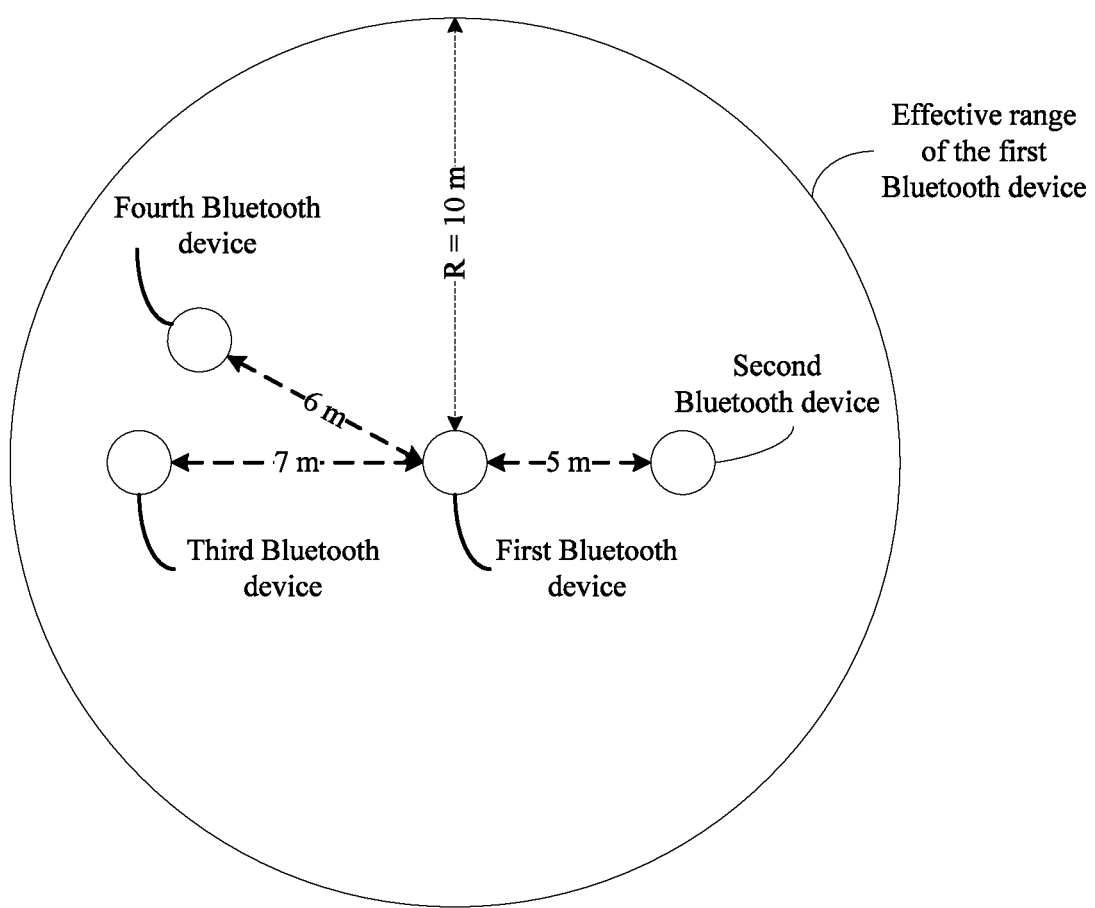
FIG. 5 is a schematic diagram of another application scenario according to an embodiment of the present invention.

In actual application, there may also be an application scenario shown in FIG. 5. Different from the application scenario shown in FIG. 1, the application scenario shown in FIG. 5 further includes a fourth Bluetooth device. The fourth Bluetooth device is located within the effective range of the first Bluetooth device, and a distance between the fourth Bluetooth device and the first Bluetooth device is 6 meters.

Figure 6A:
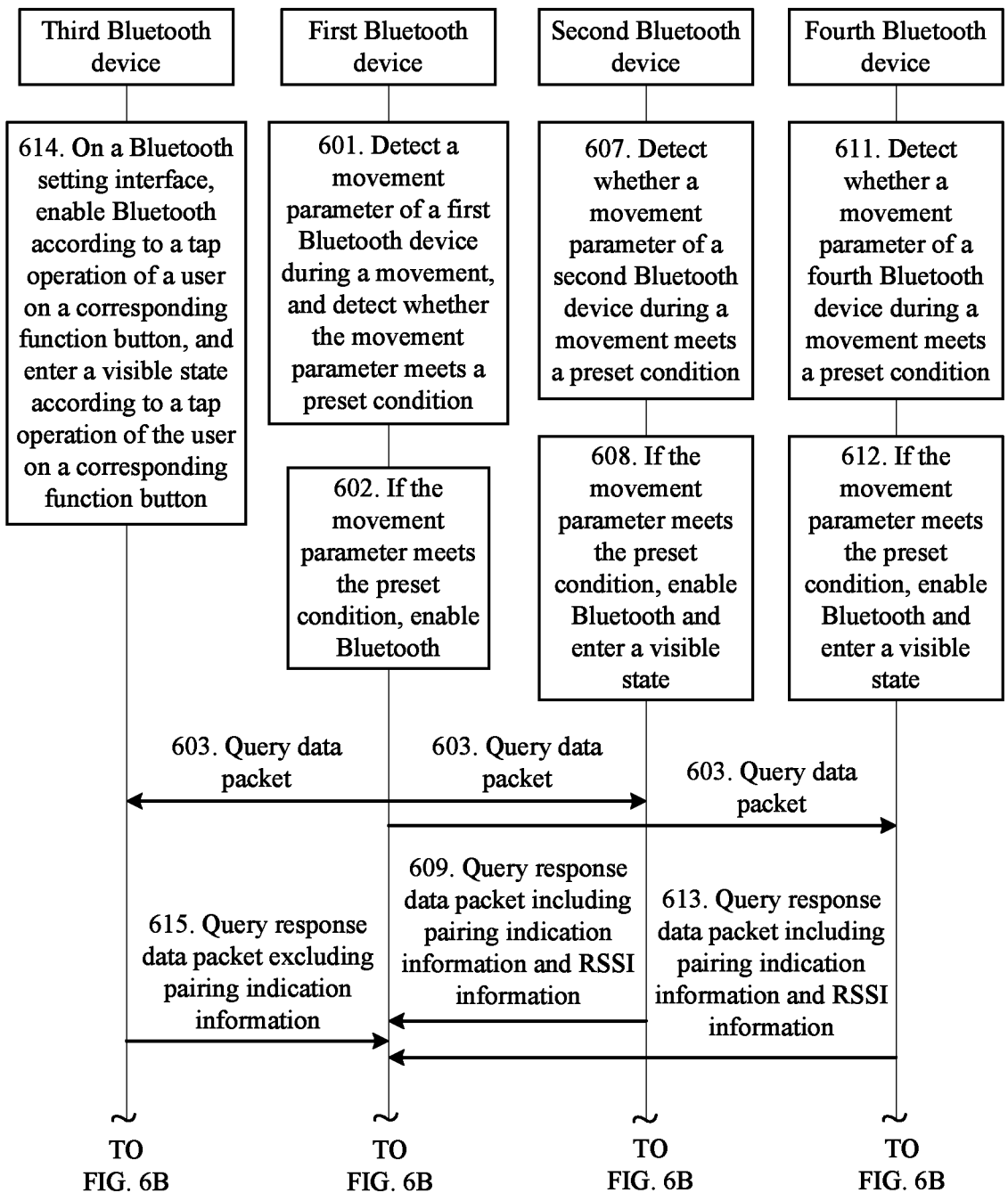
FIG. 6A and FIG. 6B are a schematic flowchart of another Bluetooth pairing method according to an embodiment of the present invention.
Figure 6B:
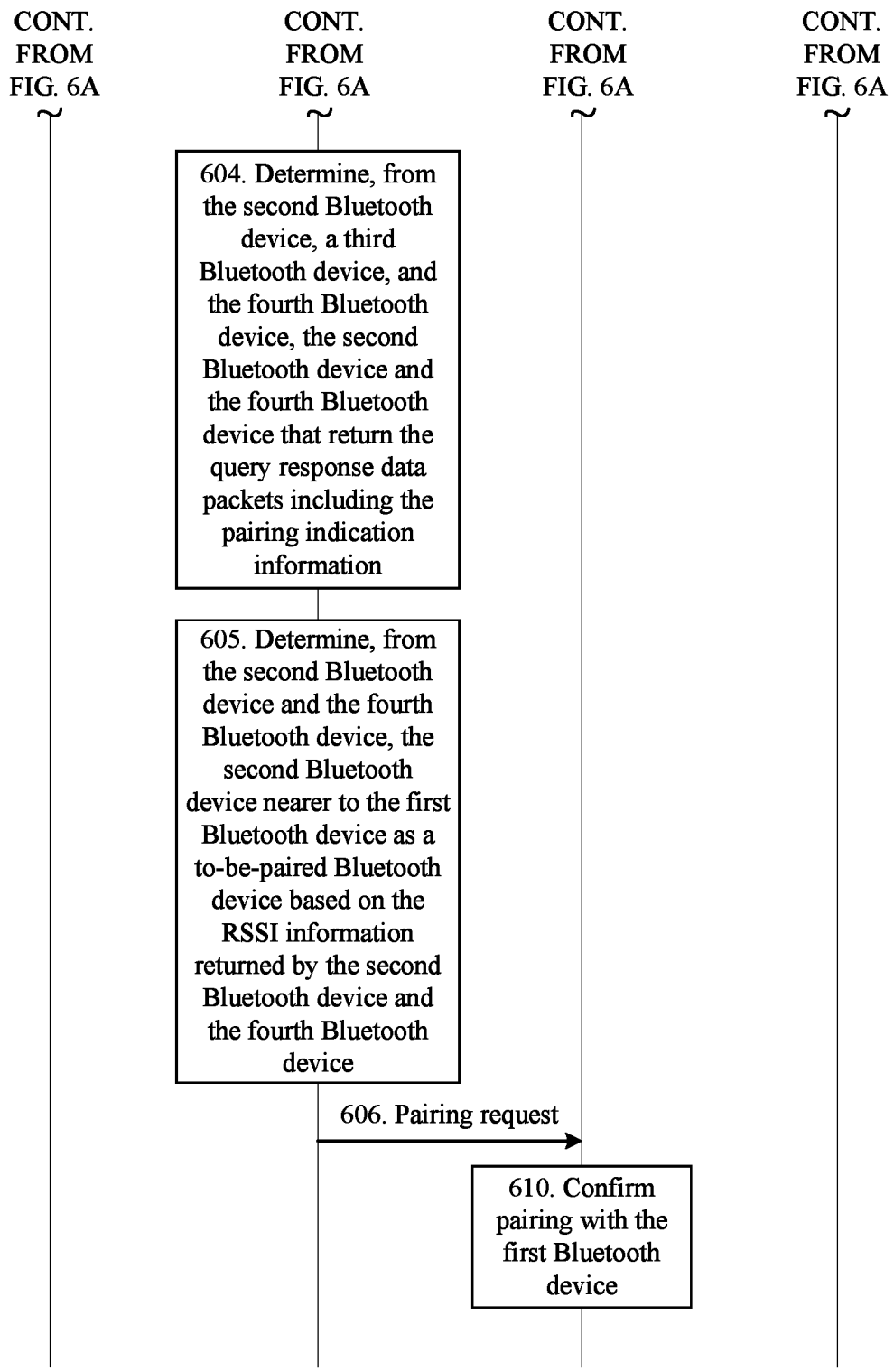

Based on the application scenario shown in FIG. 5, referring to FIG. 6A and FIG. 6B, FIG. 6A and FIG. 6B are a schematic flowchart of another Bluetooth pairing method according to an embodiment of the present invention. As shown in FIG. 6A and FIG. 6B, the fourth Bluetooth device is equivalent to the second Bluetooth device, and the fourth Bluetooth device also performs the steps performed by the second Bluetooth device.

As shown in FIG. 6A and FIG. 6B, the first Bluetooth device may perform parts 601 to 606, the second Bluetooth device may perform parts 607 to 610, the fourth Bluetooth device may perform parts 611 to 613, and the third Bluetooth device may perform parts 614 and 615.

As shown in parts 604 and 605, after the first Bluetooth device receives query response data packets returned by the second Bluetooth device, the third Bluetooth device, and the fourth Bluetooth device, the first Bluetooth device determines, from the second Bluetooth device, the third Bluetooth device, and the fourth Bluetooth device, the second Bluetooth device and the fourth Bluetooth device that return query response data packets including pairing indication information. If the query response data packets returned by a plurality of Bluetooth devices (namely, the second Bluetooth device and the fourth Bluetooth device) all include the pairing indication information, the first Bluetooth device further determines a to-be-paired Bluetooth device from the plurality of Bluetooth devices.

As shown in parts 609 and 613, the query response data packets returned by the second Bluetooth device and the fourth Bluetooth device further include RSSI information, and the RSSI information is included in basic query response data packets of the query response data packets. As shown in part 605, if both the query response data packets returned by the second Bluetooth device and the fourth Bluetooth device include the pairing indication information, the first Bluetooth device determines, from the second Bluetooth device and the fourth Bluetooth device based on the RSSI information in the query response data packets returned by the second Bluetooth device and the fourth Bluetooth device, the second Bluetooth device nearer to the first Bluetooth device as the to-be-paired Bluetooth device.

A value of RSSI information indicates a received signal strength of the first Bluetooth device. A larger value of the RSSI information indicates a shorter distance between a Bluetooth device sending the RSSI information and the first Bluetooth device, and a smaller value of the RSSI information indicates a shorter distance between the Bluetooth device sending the RSSI information and the first Bluetooth device. Optionally, the first Bluetooth device may determine, from the second Bluetooth device and the fourth Bluetooth device, the second Bluetooth device that returns RSSI information with a larger value as the to-be-paired Bluetooth device.

Optionally, the first Bluetooth device may alternatively calculate a distance between the first Bluetooth device and the second Bluetooth device based on RSSI information in a query response data packet returned by the second Bluetooth device (how to calculate a distance between two devices based on RSSI information is a well-known technology in the industry, and therefore details are not described herein), and calculate a distance between the first Bluetooth device and the third Bluetooth device based on RSSI information in a query response data packet returned by the third Bluetooth device. Then, the first Bluetooth device determines, from the second Bluetooth device and the third Bluetooth device, the second Bluetooth device, which is nearer to the first Bluetooth device, as the to-be-paired Bluetooth device.

In an optional implementation, the first Bluetooth device may alternatively use a Bluetooth device, in the second Bluetooth device and the fourth Bluetooth device, within a preset distance as the to-be-paired Bluetooth device.

In an optional implementation, the first Bluetooth device may alternatively directly use all the Bluetooth devices that return the query response data packets including the pairing indication information as to-be-paired Bluetooth devices. In other words, the first Bluetooth device directly determines the second Bluetooth device and the fourth Bluetooth device as the to-be-paired Bluetooth devices, instead of further determining the to-be-paired Bluetooth device from the second Bluetooth device and the fourth Bluetooth device.

In actual application, a plurality of Bluetooth devices within the effective range of the first Bluetooth device may perform Bluetooth pairing by performing preset movements. After the Bluetooth pairing method described in FIG. 6A and FIG. 6B is implemented, if the first Bluetooth device wants to pair with only the second Bluetooth device within the effective range, a user only needs to place the first Bluetooth device close to the second Bluetooth device, and hold the first Bluetooth device and the second Bluetooth device to perform preset movements, so that the first Bluetooth device and the second Bluetooth device can be accurately paired, achieving quick and convenient Bluetooth pairing.

Figure 7A:
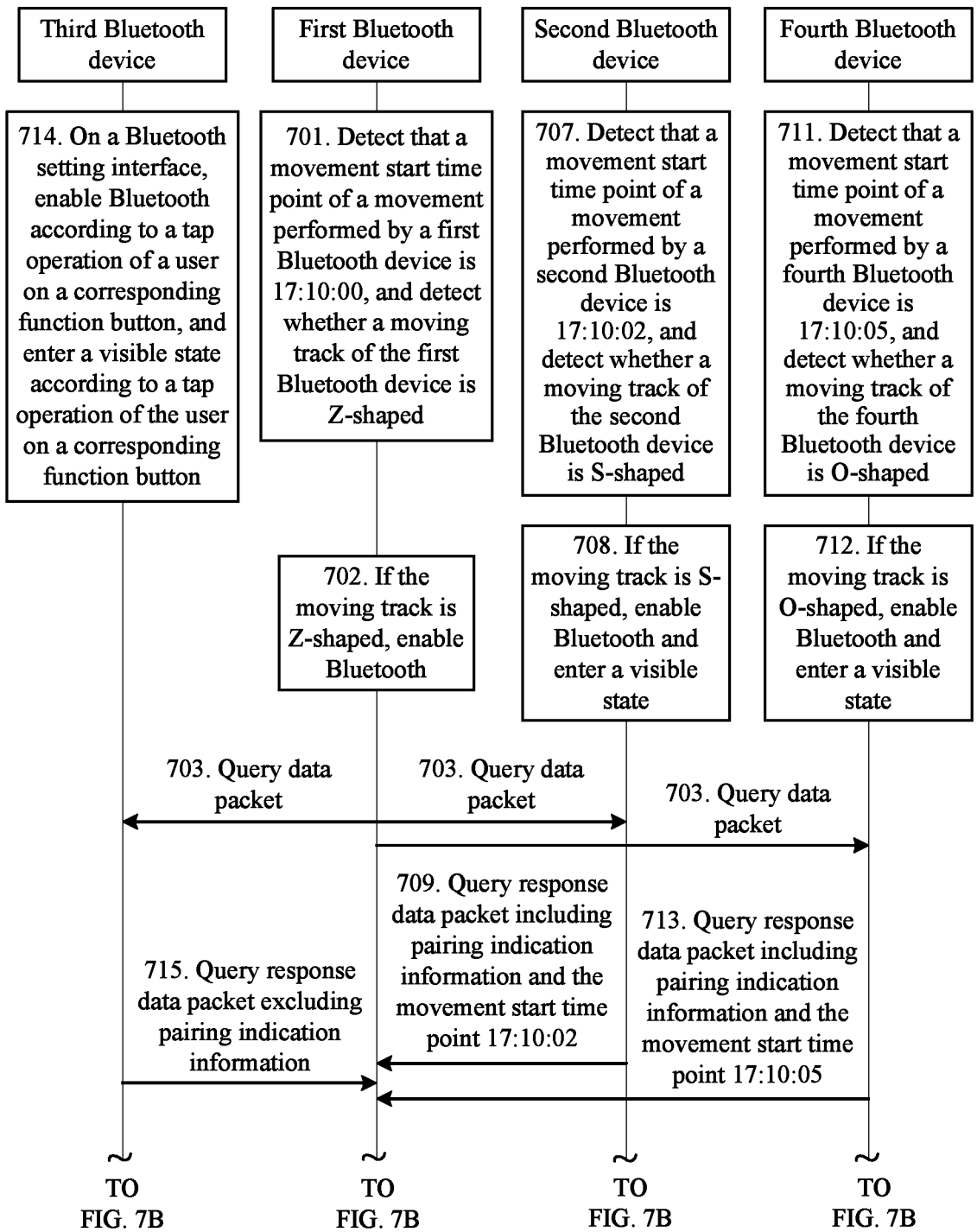
FIG. 7A and FIG. 7B are a schematic flowchart of still another Bluetooth pairing method according to an embodiment of the present invention.
Figure 7B:
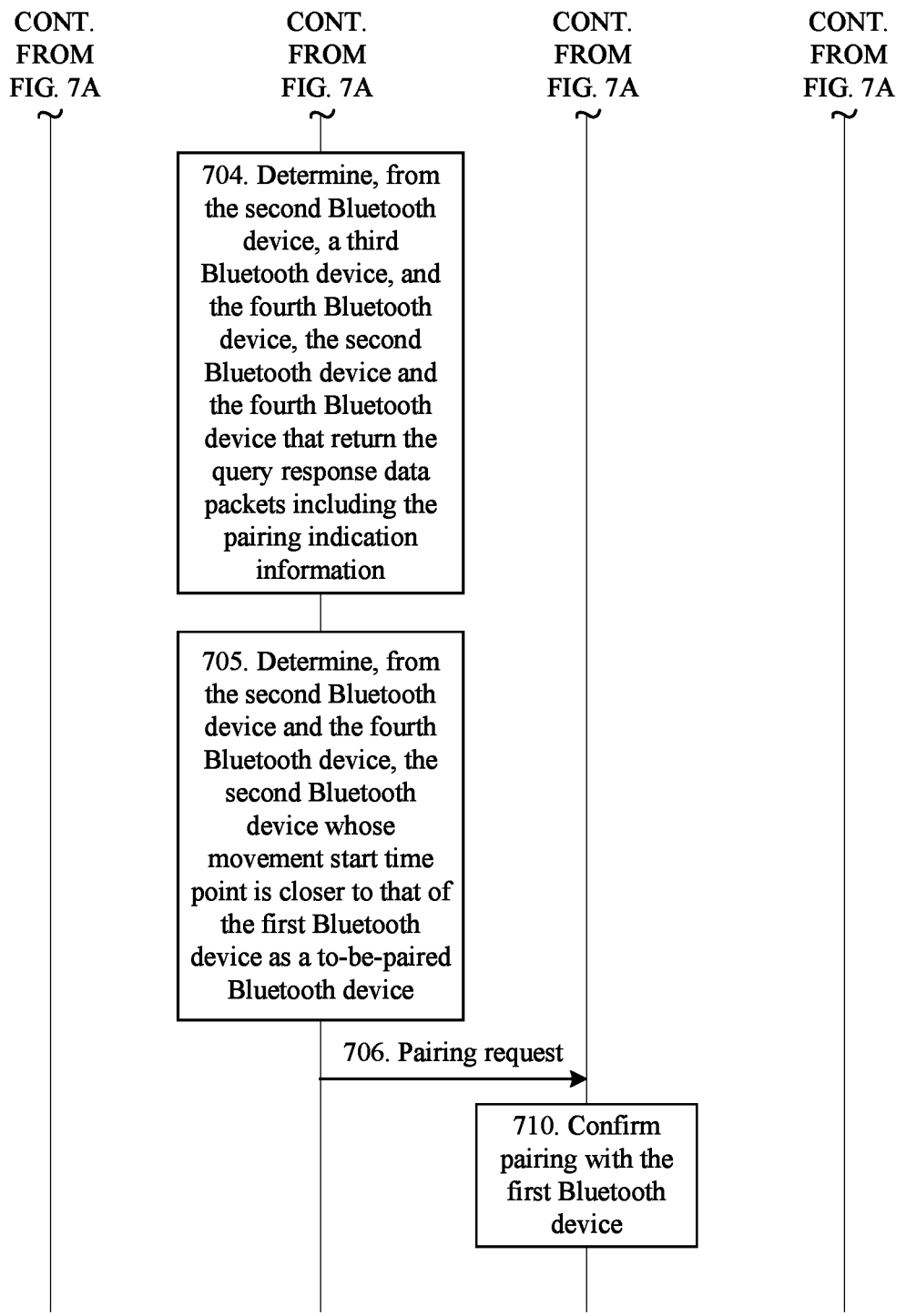

Based on the application scenario shown in FIG. 5, referring to FIG. 7A and FIG. 7B, FIG. 7A and FIG. 7B are a schematic flowchart of still another Bluetooth pairing method according to an embodiment of the present invention. As shown in FIG. 7A and FIG. 7B, the fourth Bluetooth device is equivalent to the second Bluetooth device, and the fourth Bluetooth device also performs the steps performed by the second Bluetooth device.

As shown in FIG. 7A and FIG. 7B, the first Bluetooth device further detects movement time information of the first Bluetooth device during a movement, and the second Bluetooth device and the fourth Bluetooth devices also detect their movement time information during a movement. Query response data packets returned by the second Bluetooth device and the fourth Bluetooth device to the first Bluetooth device include the detected movement time information. The movement time information is included in extended query response data packets of the query response data packets. If both the query response data packets returned by the second Bluetooth device and the fourth Bluetooth device include pairing indication information, the first Bluetooth device may further determine, from the second Bluetooth device and the fourth Bluetooth device, a to-be-paired Bluetooth device based on the movement time information included in the query response data packets and the movement time information detected by the first Bluetooth device.

The movement time information may be a movement start time point or a movement end time point of a preset movement (a movement whose movement parameter meets a preset condition) performed by the first Bluetooth device, the second Bluetooth device, or the fourth Bluetooth device. For example, if the second Bluetooth device performs the preset movement in a time period from 17:10:00 to 17:10:04, the movement start time point is 17:10:00, and the movement end time point is 17:10:04.

In an optional implementation, if the movement time information is the movement start time point, and both the query response data packets returned by the second Bluetooth device and the fourth Bluetooth device include the pairing indication information, the first Bluetooth device selects, from the second Bluetooth device and the fourth Bluetooth device, a Bluetooth device that returns a movement start time point closer to a movement start time point detected by the first Bluetooth device, as the to-be-paired Bluetooth device.

In an optional implementation, if the movement time information is the movement end time point, and both the query response data packets returned by the second Bluetooth device and the fourth Bluetooth device include the pairing indication information, the first Bluetooth device selects, from the second Bluetooth device and the fourth Bluetooth device, a Bluetooth device that returns a movement end time point closer to a movement end time point detected by the first Bluetooth device, as the to-be-paired Bluetooth device.

In FIG. 7A and FIG. 7B, an example in which the movement time information is the movement start time point is used. In FIG. 7A and FIG. 7B, a preset track of the first Bluetooth device is a Z-shaped moving track, a preset track of the second Bluetooth device is an S-shaped moving track, and a preset track of the fourth Bluetooth device is an O-shaped moving track. A user A holds the first Bluetooth device to perform a movement in the Z-shaped moving track from 17:10:00. A user B holds the second Bluetooth device to perform a movement in the S-shaped moving track from 17:10:02. A user C holds the fourth Bluetooth device to perform a movement in the O-shaped moving track from 17:10:05. As shown in FIG. 7A and FIG. 7B, the first Bluetooth device may perform parts 701 to 706, the second Bluetooth device may perform parts 707 to 710, the fourth Bluetooth device may perform parts 711 to 713, and the third Bluetooth device may perform parts 714 and 715.

In actual application, a plurality of Bluetooth devices within the effective range of the first Bluetooth device may perform Bluetooth pairing by performing preset movements. After the Bluetooth pairing method described in FIG. 7A and FIG. 7B is implemented, if a user wants to pair the first Bluetooth device with the second Bluetooth device, the user only needs to hold the first Bluetooth device and the second Bluetooth device to perform preset movements at a same time (or at similar times), so that the first Bluetooth device and the second Bluetooth device can be automatically paired accurately, conveniently, and quickly.

In an optional implementation, the first Bluetooth device may also have a function of the second Bluetooth device, and the second Bluetooth device may also have a function of the first Bluetooth device.

Figure 8:
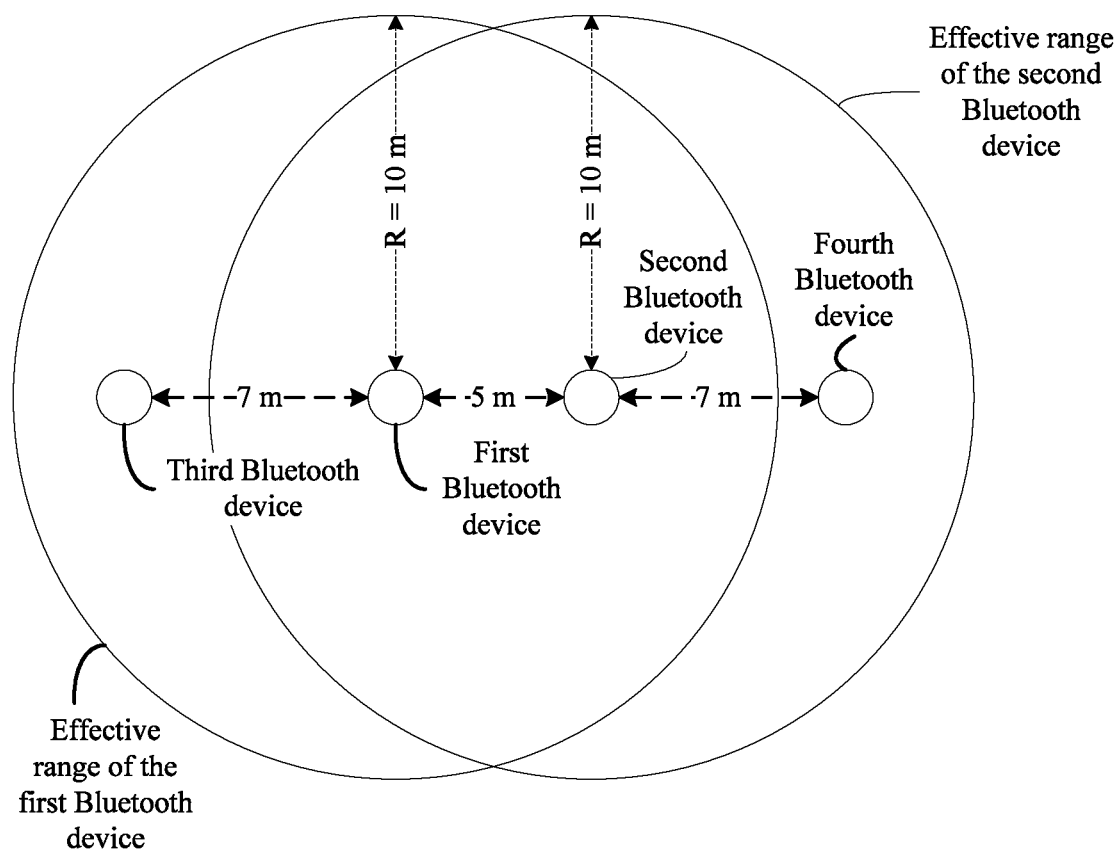
FIG. 8 is a schematic diagram of still another application scenario according to an embodiment of the present invention.

For example, FIG. 8 is a schematic diagram of still another application scenario according to an embodiment of the present invention. As shown in FIG. 8, the application scenario includes four Bluetooth devices: a first Bluetooth device, a second Bluetooth device, a third Bluetooth device, and a fourth Bluetooth device. The second Bluetooth device and the third Bluetooth device are located in an effective range of the first Bluetooth device. The first Bluetooth device and the fourth Bluetooth device are located in an effective range of the second Bluetooth device. A distance between the first Bluetooth device and the third Bluetooth device is 7 meters, a distance between the first Bluetooth device and the second Bluetooth device is 5 meters, and a distance between the second Bluetooth device and the fourth Bluetooth device is 7 meters. Based on the application scenario shown in FIG. 8, referring to FIG. 9A and FIG. 9B, FIG. 9A and FIG. 9B are a schematic flowchart of still another Bluetooth pairing method according to an embodiment of the present invention.

Figure 9A:
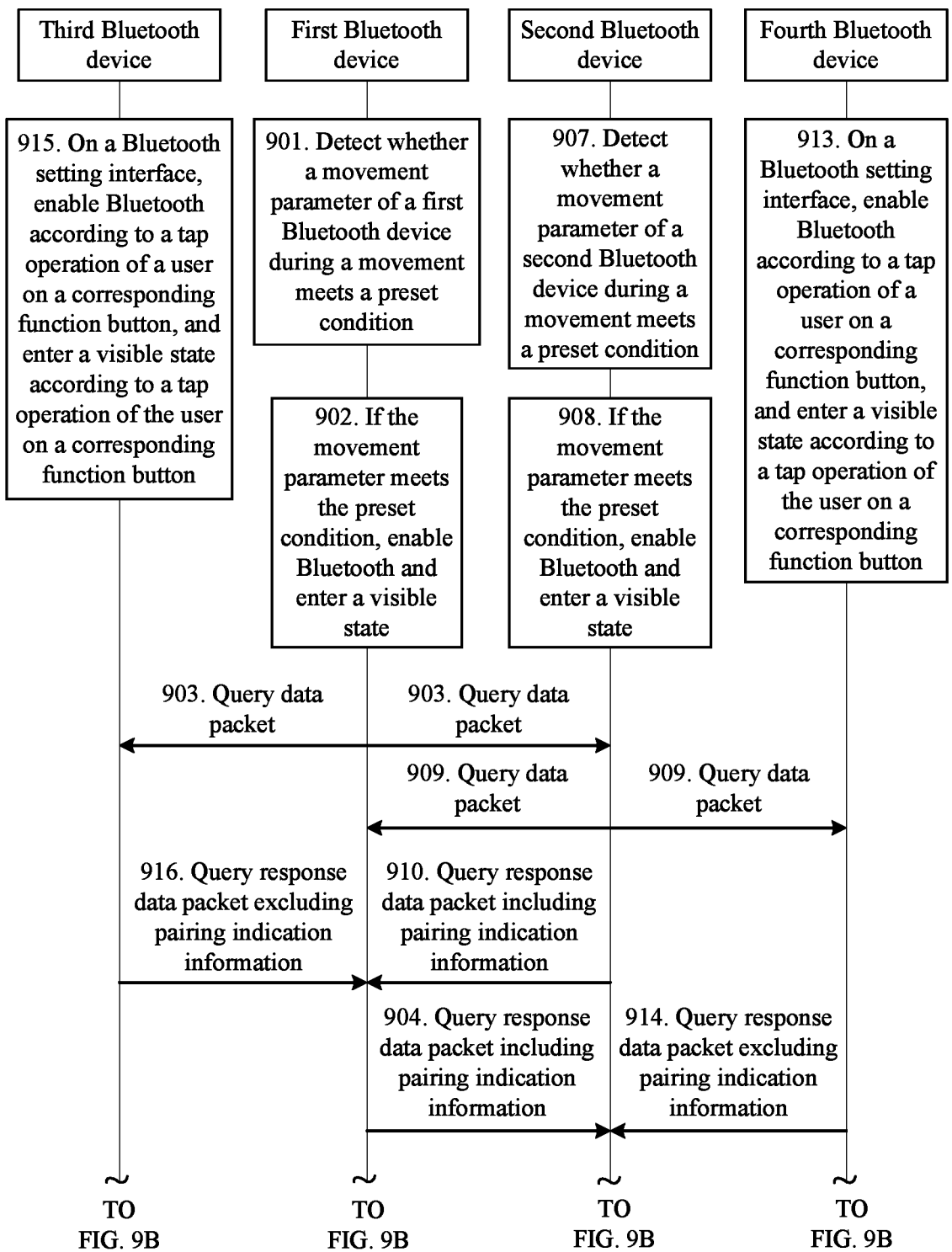
FIG. 9A and FIG. 9B are a schematic flowchart of still another Bluetooth pairing method according to an embodiment of the present invention.
Figure 9B:
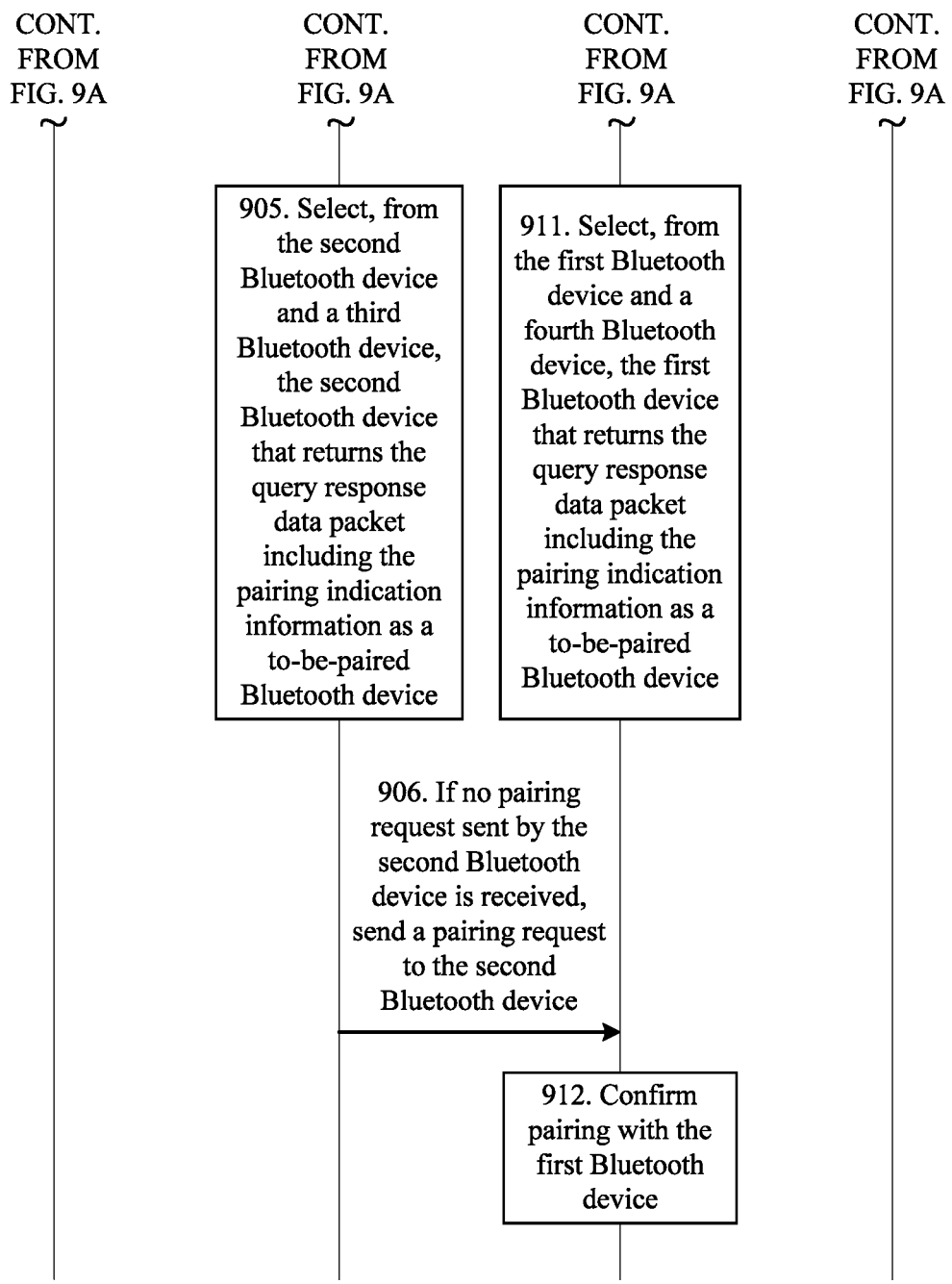

As shown in FIG. 9A and FIG. 9B, the first Bluetooth device may perform parts 901 to 906, and the second Bluetooth device may perform parts 906 to 912.

As shown in FIG. 9A and FIG. 9B, after the first Bluetooth device determines the second Bluetooth device as a to-be-paired Bluetooth device, if the first Bluetooth device has not received a pairing request sent by the second Bluetooth device, the first Bluetooth device sends a pairing request to the second Bluetooth device; and after receiving the pairing request, the second Bluetooth device automatically confirms pairing with the first Bluetooth device. Correspondingly, if the first Bluetooth device receives a pairing request sent by the second Bluetooth device, the first Bluetooth device automatically confirms pairing with the second Bluetooth device; and after the first Bluetooth device automatically confirms pairing with the second Bluetooth device and the first Bluetooth device determines the second Bluetooth device as a to-be-paired Bluetooth device, the first Bluetooth device no longer sends a pairing request to the second Bluetooth device.

Similarly, after the second Bluetooth device determines the first Bluetooth device as a to-be-paired Bluetooth device, if the second Bluetooth device has not received a pairing request sent by the first Bluetooth device, the second Bluetooth device sends a pairing request to the first Bluetooth device; and after receiving the pairing request, the first Bluetooth device automatically confirms pairing with the second Bluetooth device. Correspondingly, if the second Bluetooth device receives a pairing request sent by the first Bluetooth device, the second Bluetooth device automatically confirms pairing with the first Bluetooth device; and after the second Bluetooth device automatically confirms pairing with the first Bluetooth device and the second Bluetooth device determines the first Bluetooth device as a to-be-paired Bluetooth device, the second Bluetooth device no longer sends a pairing request to the first Bluetooth device.

It can be learned that, after the method, the first Bluetooth device, and the second Bluetooth device shown in FIG. 9A and FIG. 9B are implemented, if a user wants to pair the first Bluetooth device with the second Bluetooth device, the user only needs to hold the first Bluetooth device to perform a preset movement, and hold the second Bluetooth device to perform a preset movement, so that the first Bluetooth device and the second Bluetooth device can be paired quickly and conveniently.

Figure 10:
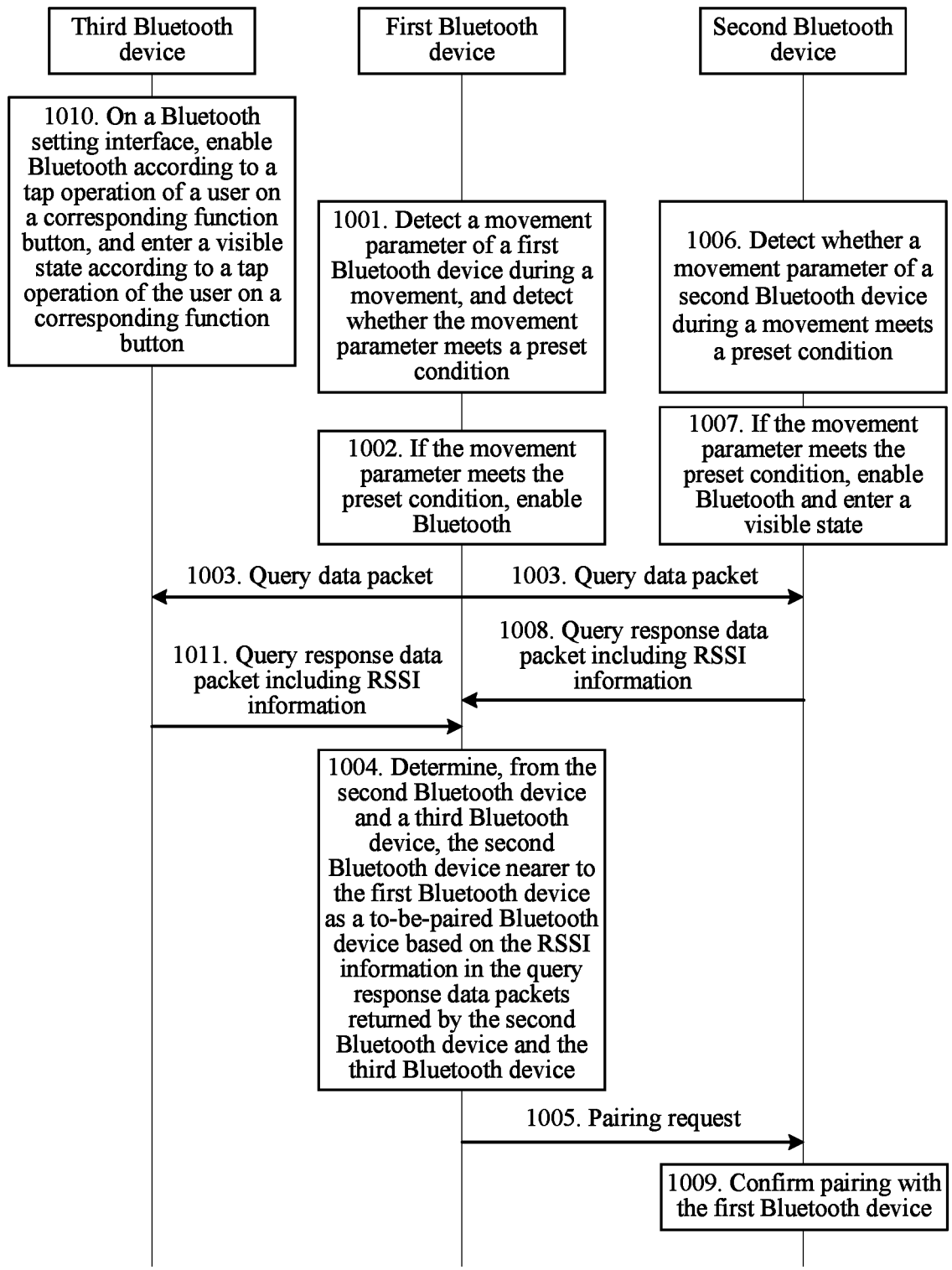
FIG. 10 is a schematic flowchart of still another Bluetooth pairing method according to an embodiment of the present invention.

Based on the application scenario shown in FIG. 1, referring to FIG. 10, FIG. 10 is a schematic flowchart of still another Bluetooth pairing method according to an embodiment of the present invention. A difference between the Bluetooth pairing method shown in FIG. 10 and the Bluetooth pairing method shown in FIG. 2 lies in that the first Bluetooth device determines a to-be-paired Bluetooth device based only on RSSI information in query response data packets received by the first Bluetooth device.

As shown in FIG. 10, the first Bluetooth device may perform parts 1001 to 1005.

As shown in FIG. 10, the second Bluetooth device may perform parts 1006 to 1009. In part 1008, the second Bluetooth device returns a query response data packet to the first Bluetooth device, and the query response data packet includes RSSI information. The RSSI information is included in a basic query response data packet of the query response data packet.

As shown in FIG. 10, the third Bluetooth device may perform parts 1010 and 1011. In part 1011, the third Bluetooth device returns a query response data packet to the first Bluetooth device, and the query response data packet includes RSSI information. Similarly, the RSSI information is included in a basic query response data packet of the query response data packet.

As shown in FIG. 10, after the first Bluetooth device receives the query response data packets returned by the second Bluetooth device and the third Bluetooth device, the first Bluetooth device may determine, from the second Bluetooth device and the third Bluetooth device, the second Bluetooth device nearer to the first Bluetooth device as the to-be-paired Bluetooth device based on the RSSI information in the query response data packets returned by the second Bluetooth device and the third Bluetooth device. For how the first Bluetooth device determines, from the second Bluetooth device and the third Bluetooth device, the second Bluetooth device nearer to the first Bluetooth device as the to-be-paired Bluetooth device based on the RSSI information, refer to the description of the embodiment corresponding to FIG. 6A and FIG. 6B.

In an optional implementation, the first Bluetooth device may alternatively determine, from the second Bluetooth device and the third Bluetooth device, a Bluetooth device within a preset distance as the to-be-paired Bluetooth device.

It can be learned that, after the method described in FIG. 10 is implemented, if a user wants to pair the first Bluetooth device with the second Bluetooth device, the user only needs to place the first Bluetooth device close to the second Bluetooth device, hold the first Bluetooth device to perform a preset movement, and hold the second Bluetooth device to perform a preset movement, so that the first Bluetooth device and the second Bluetooth device can be paired quickly and conveniently.

In an optional implementation, the first Bluetooth device may also have a function of the second Bluetooth device, and the second Bluetooth device may also have a function of the first Bluetooth device. For example, based on the application scenario shown in FIG. 8, referring to FIG. 11A and FIG. 11B, FIG. 11A and FIG. 11B are a schematic flowchart of still another Bluetooth pairing method according to an embodiment of the present invention.

Figure 11A:
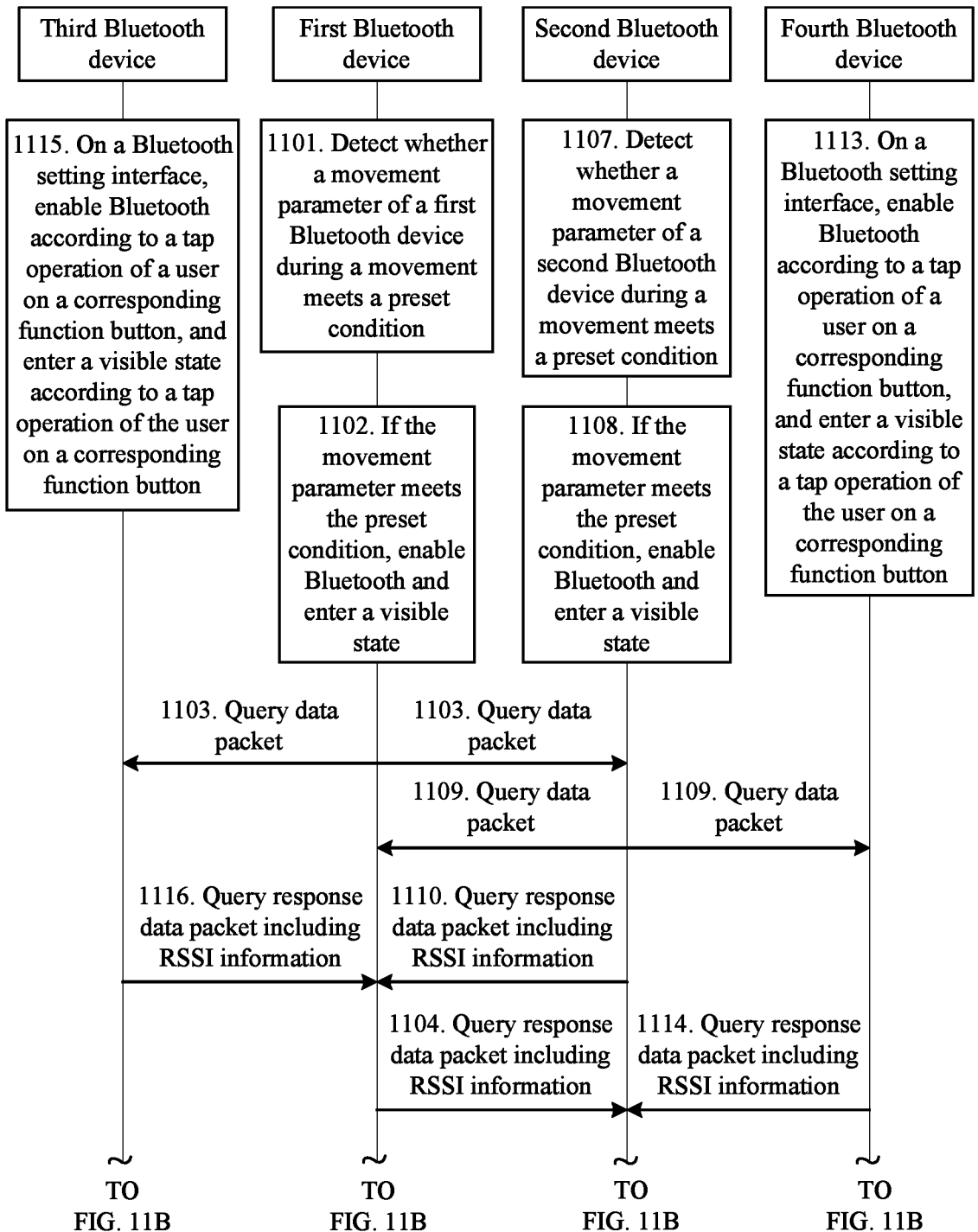
FIG. 11A and FIG. 11B are a schematic flowchart of still another Bluetooth pairing method according to an embodiment of the present invention.
Figure 11B:
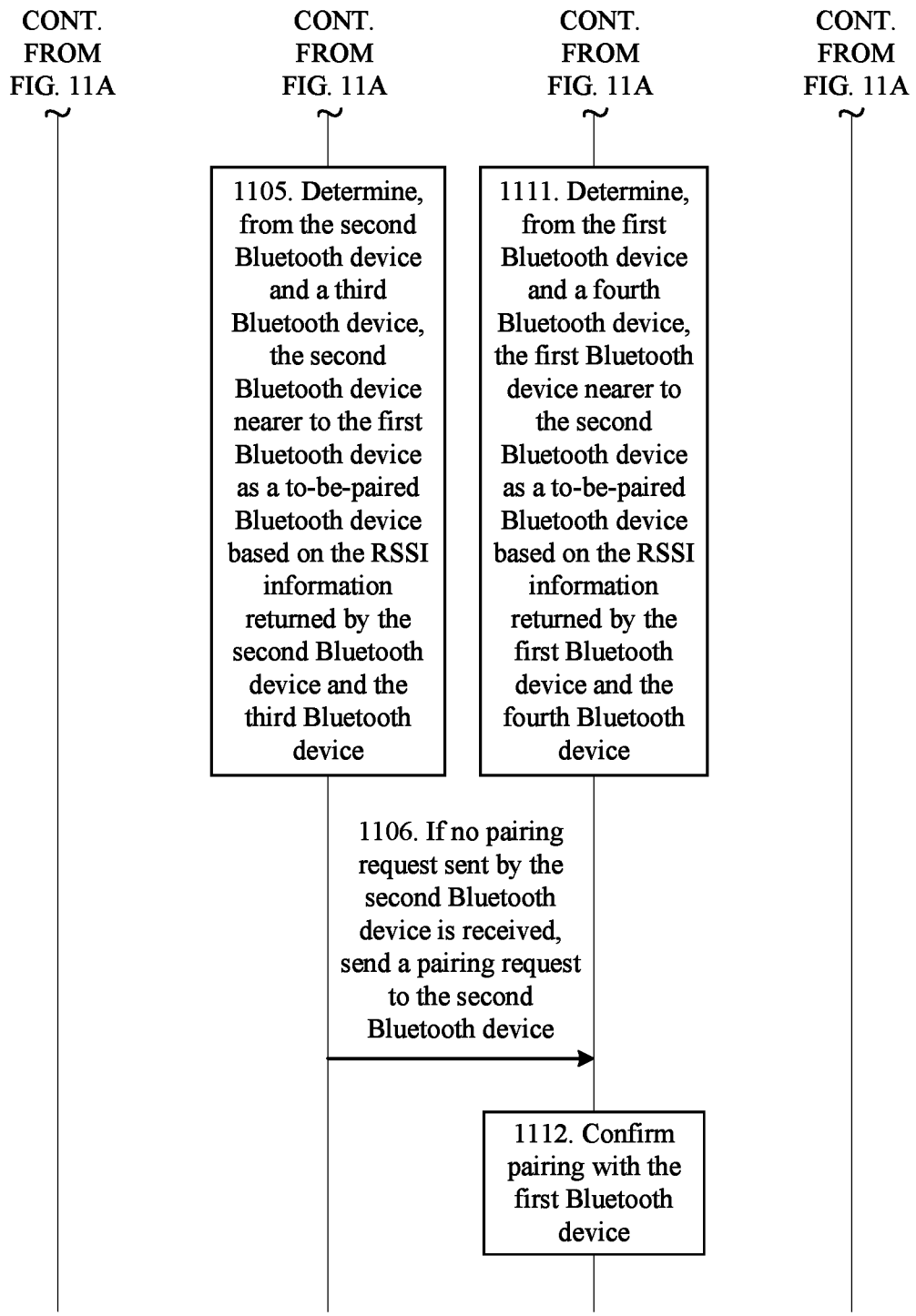

As shown in FIG. 11A and FIG. 11B, the first Bluetooth device may perform parts 1101 to 1106, and the second Bluetooth device may perform parts 1107 to 1112.

As shown in FIG. 11A and FIG. 11B, after the first Bluetooth device determines the second Bluetooth device as a to-be-paired Bluetooth device, if the first Bluetooth device has not received a pairing request sent by the second Bluetooth device, the first Bluetooth device sends a pairing request to the second Bluetooth device; and after receiving the pairing request, the second Bluetooth device automatically confirms pairing with the first Bluetooth device. Correspondingly, if the first Bluetooth device receives a pairing request sent by the second Bluetooth device, the first Bluetooth device automatically confirms pairing with the second Bluetooth device; and after the first Bluetooth device automatically confirms pairing with the second Bluetooth device and the first Bluetooth device determines the second Bluetooth device as a to-be-paired Bluetooth device, the first Bluetooth device no longer sends a pairing request to the second Bluetooth device. A case is similar for the second Bluetooth device.

It can be learned that, after the method, the first Bluetooth device, and the second Bluetooth device shown in FIG. 11A and FIG. 11B are implemented, if a user wants to pair the first Bluetooth device with the second Bluetooth device, the user only needs to place the first Bluetooth device close to the second Bluetooth device, hold the first Bluetooth device to perform a preset movement, and hold the second Bluetooth device to perform a preset movement, so that the first Bluetooth device and the second Bluetooth device can be paired quickly and conveniently.

Figure 12:
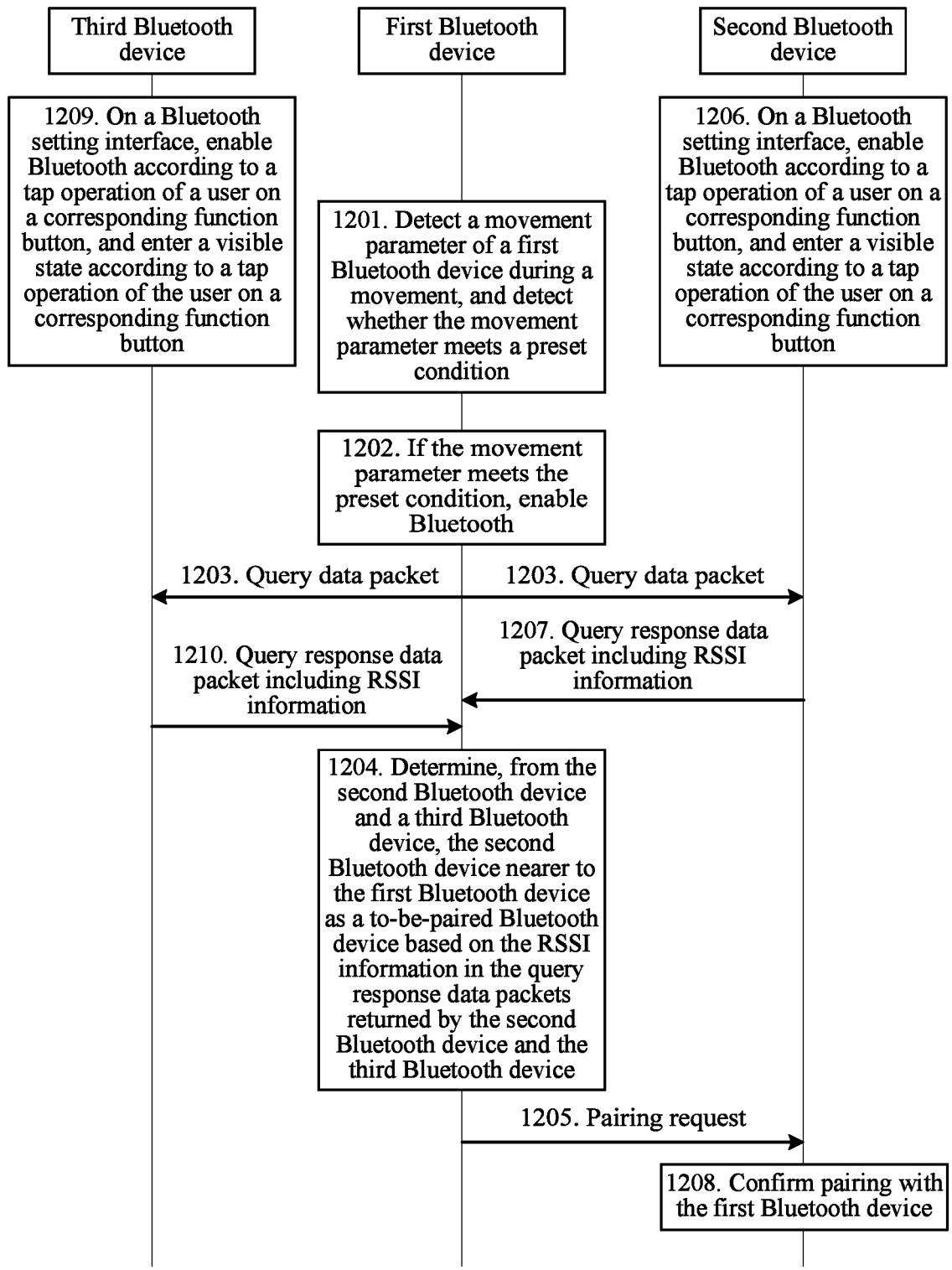
FIG. 12 is a schematic flowchart of still another Bluetooth pairing method according to an embodiment of the present invention.

In actual application, there is also a case in which the first Bluetooth device needs to be paired with a device that the user cannot hold to perform a movement. For example, the first Bluetooth device needs to be paired with a desktop computer. In this case, based on the application scenario shown in FIG. 1, referring to FIG. 12, FIG. 12 is a schematic flowchart of still another Bluetooth pairing method according to an embodiment of the present invention. In the application scenario shown in FIG. 1, the second Bluetooth device and the third Bluetooth device are devices that a user cannot hold to perform a movement, for example, desktop computers.

As shown in FIG. 12, the first Bluetooth device may perform parts 1201 to 1205.

As shown in FIG. 12, the second Bluetooth device and the third Bluetooth device are in a visible state, and the second Bluetooth device and the third Bluetooth device enter the visible state after the user manually taps function buttons on the Bluetooth devices. The second Bluetooth device may perform parts 1206 to 1208, and the third Bluetooth device may perform parts 1209 and 1210.

As shown in FIG. 12, in part 1204, the first Bluetooth device determines, from the second Bluetooth device and the third Bluetooth device, the second Bluetooth device, which is nearer to the first Bluetooth device, as a to-be-paired Bluetooth device based on RSSI information in query response data packets returned by the second Bluetooth device and the third Bluetooth device. It should be noted that the first Bluetooth device may alternatively determine, from the second Bluetooth device and the third Bluetooth device, a Bluetooth device within a preset distance as a to-be-paired Bluetooth device based on RSSI information in query response data packets.

It can be learned that, after the Bluetooth pairing method shown in FIG. 12 is implemented, if the first Bluetooth device needs to be paired with the second Bluetooth device, a user only needs to hold the first Bluetooth device to approach the second Bluetooth device and perform a preset movement, so that the first Bluetooth device and the second Bluetooth device can be automatically paired, achieving quick and convenient Bluetooth pairing.

It should be noted that some steps of the first Bluetooth device and the second Bluetooth device in FIG. 6A and FIG. 6B, FIG. 7A and FIG. 7B, and FIG. 9A to FIG. 12 are the same as some steps of the first Bluetooth device and the second Bluetooth device in FIG. 2. For specific descriptions of the same steps, refer to the descriptions in the embodiment corresponding to FIG. 2.

It should be noted that, in the embodiments of the present invention, the first Bluetooth device, the second Bluetooth device, and the like may be divided into functional units based on the foregoing method examples. For example, functional units corresponding to various functions may be obtained through division, or two or more functions may be integrated into one unit. The integrated unit may be implemented in a form of hardware, or may be implemented in a form of a software functional unit. The hardware or software includes one or more units corresponding to the functions. The unit may be software and/or hardware.

Figure 13:
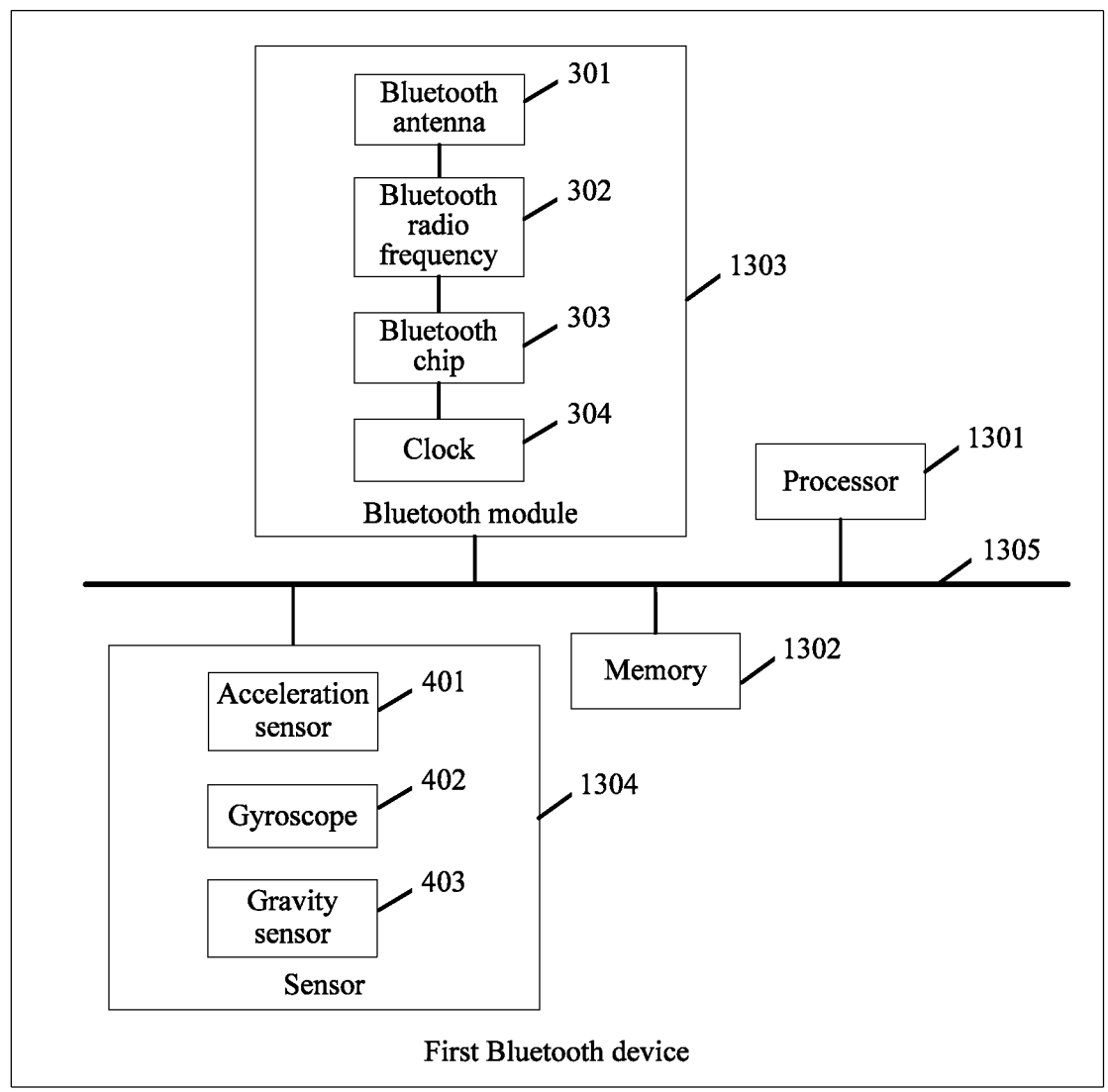
FIG. 13 is a schematic structural diagram of a first Bluetooth device according to an embodiment of the present invention.

Referring to FIG. 13, FIG. 13 is a schematic structural diagram of a first Bluetooth device according to an embodiment of the present invention. As shown in FIG. 13, the first Bluetooth device may include a processor 1301, a memory 1302, a Bluetooth module 1303 (including a Bluetooth antenna 301, Bluetooth radio frequency 302, a Bluetooth chip 303, and a clock 304), a sensor 1304 (including an acceleration sensor 401, a gyroscope 402, and a gravity sensor 403), and a bus 1305. The memory 1302, the Bluetooth module 1303, and the sensor 1304 are connected to the processor 1301 by using the bus 1305.

The memory 1302 may be configured to store a software program and a module. The processor 1301 runs the software program and the module that are stored in the memory 1302, to execute various function applications of the first Bluetooth device and perform data processing. The memory 1302 may mainly include a program storage area and a data storage area. The program storage area may store an operating system, an application program required by at least one function (such as an audio playback function and an image playback function), and the like. The data storage area may store data (such as audio data and a phone book) created according to use of the first Bluetooth device, and the like. In addition, the memory 1302 may include a high-speed random access memory, and may further include a non-volatile memory such as at least one disk storage device, a flash memory device, or another volatile solid-state storage device.

The processor 1301 may be a central processing unit (Central Processing Unit, CPU), a general-purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. Alternatively, the processor 1301 may be a combination implementing a computing function, for example, a combination including one or more microprocessors, or a combination of a DSP and a microprocessor. The processor 1301 is configured to perform the steps independent of a Bluetooth protocol that are performed by the first Bluetooth device in FIG. 2, FIG. 6A and FIG. 6B, FIG. 7A and FIG. 7B, and FIG. 9A to FIG. 12. For example, the processor 1301 may be configured to: detect a movement parameter of the first Bluetooth device during a movement, and detect whether the movement parameter meets a preset condition.

The sensor 1304 is configured to detect information such as a movement speed, a movement direction or a movement acceleration of the first Bluetooth device, and the sensor 1304 transmits the detected information to the processor 1301 by using the bus 1305, so that the processor 1301 obtains the movement parameter of the first Bluetooth device based on the information detected by the sensor 1304. For example, if the movement parameter is a moving track, the processor 1301 may obtain the moving track based on the movement direction and the movement acceleration.

The Bluetooth module 1303 is configured to implement the steps associated with the Bluetooth protocol that are performed by the first Bluetooth device in FIG. 2, FIG. 6A and FIG. 6B, FIG. 7A and FIG. 7B, and FIG. 9A to FIG. 12. For example, the Bluetooth module 1303 may be configured to: enable Bluetooth, and broadcast a query data packet to Bluetooth devices within an effective range; receive query response data packets returned by the Bluetooth devices within the effective range; determine a to-be-paired Bluetooth device from the Bluetooth devices within the effective range based on information in the query response data packets; and send a pairing request to the to-be-paired Bluetooth device. Alternatively, the Bluetooth module 1303 may be configured to: enable Bluetooth, and enter a visible state; receive query data packets broadcast by Bluetooth devices within an effective range, and return query response data packets to the Bluetooth devices within the effective range; and receive pairing requests sent by the Bluetooth devices within the effective range, and confirm pairing.

Figure 14:
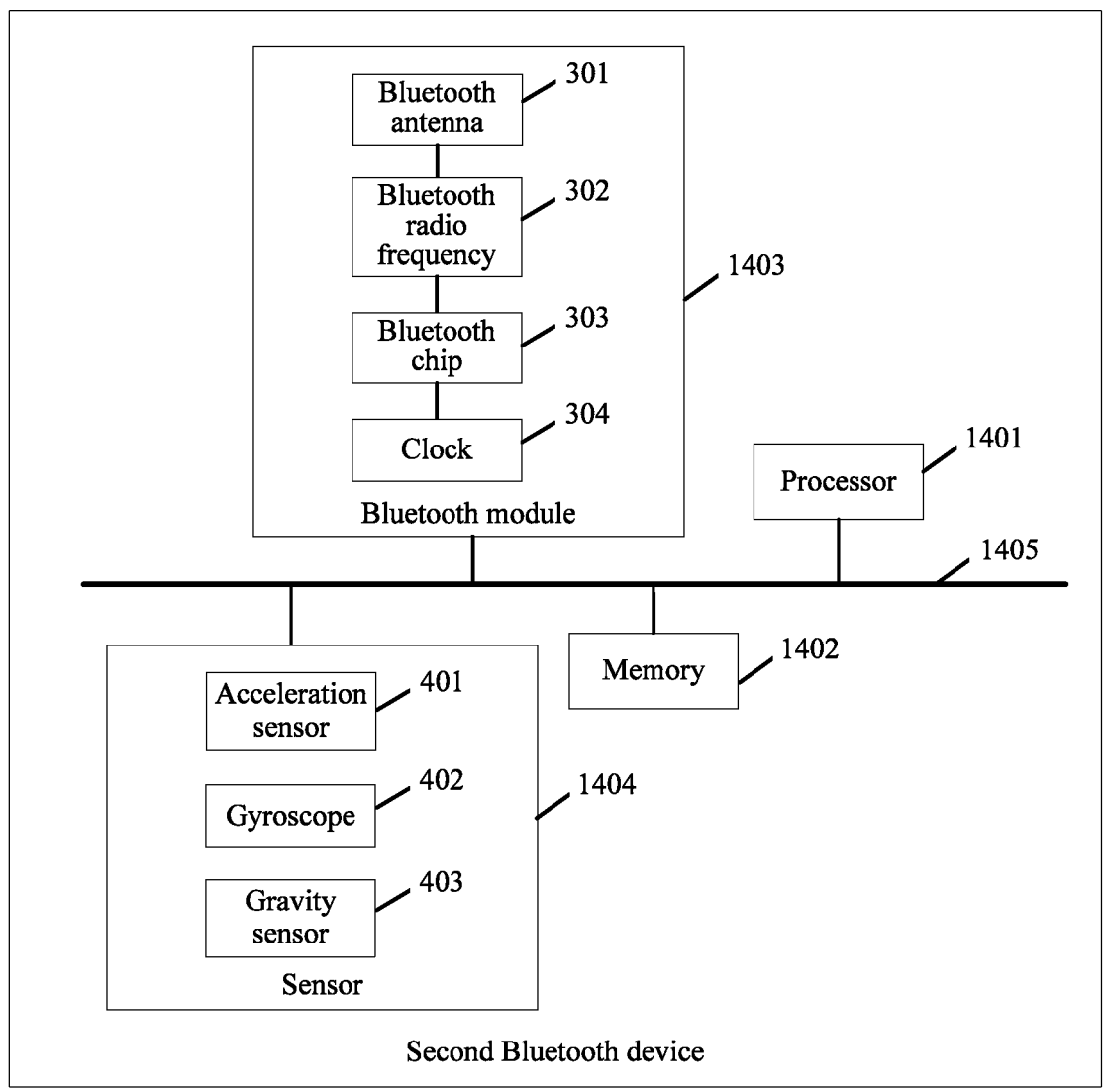
FIG. 14 is a schematic structural diagram of a second Bluetooth device according to an embodiment of the present invention.

Referring to FIG. 14, FIG. 14 is a schematic structural diagram of a second Bluetooth device according to an embodiment of the present invention. As shown in FIG. 14, the second Bluetooth device may include a processor 1401, a memory 1402, a Bluetooth module 1403 (including a Bluetooth antenna 301, Bluetooth radio frequency 302, a Bluetooth chip 303, and a clock 304), a sensor 1404 (including an acceleration sensor 401, a gyroscope 402, and a gravity sensor 403), and a bus 1405. The memory 1402, the Bluetooth module 1403, and the sensor 1404 are connected to the processor 1401 by using the bus 1405.

The memory 1402 may be configured to store a software program and a module. The processor 1401 and the Bluetooth module 1403 run the software program and the module that are stored in the memory 1402, so that the second Bluetooth device performs the steps of the second Bluetooth device in FIG. 2, FIG. 6A and FIG. 6B, FIG. 7A and FIG. 7B, and FIG. 9A to FIG. 11B. The memory 1402 may mainly include a program storage area and a data storage area. The program storage area may store an operating system, an application program required by at least one function (such as an audio playback function and an image playback function), and the like. The data storage area may store data (such as audio data and a phone book) created according to use of the second Bluetooth device, and the like. In addition, the memory 1402 may include a high-speed random access memory, and may further include a nonvolatile memory such as at least one disk storage device, a flash memory device, or another volatile solid-state storage device.

The processor 1401 may be a central processing unit (Central Processing Unit, CPU), a general-purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. Alternatively, the processor 1401 may be a combination implementing a computing function, for example, a combination including one or more microprocessors, or a combination of a DSP and a microprocessor. The processor 1401 is configured to perform the steps independent of a Bluetooth protocol that are performed by the second Bluetooth device in FIG. 2, FIG. 6A and FIG. 6B, FIG. 7A and FIG. 7B, and FIG. 9A to FIG. 11B. For example, the processor 1401 may be configured to: detect a movement parameter of the second Bluetooth device during a movement, and detect whether the movement parameter meets a preset condition.

The sensor 1404 is configured to detect information such as a movement speed, a movement direction or a movement acceleration of the second Bluetooth device, and the sensor 1404 transmits the detected information to the processor 1401 by using the bus 1405, so that the processor 1401 obtains the movement parameter of the second Bluetooth device based on the information detected by the sensor 1404. For example, if the movement parameter is a moving track, the processor 1401 may obtain the moving track based on the movement direction and the movement acceleration.

The Bluetooth module 1403 is configured to implement the steps associated with the Bluetooth protocol that are performed by the second Bluetooth device in FIG. 2, FIG. 6A and FIG. 6B, FIG. 7A and FIG. 7B, and FIG. 9A to FIG. 11B. For example, the Bluetooth module 1403 may be configured to: enable Bluetooth, and enter a visible state; receive query data packets broadcast by Bluetooth devices within an effective range, and return query response data packets to the Bluetooth devices within the effective range; and receive pairing requests sent by the Bluetooth devices within the effective range, and confirm pairing. Alternatively, the Bluetooth module 1403 may be configured to: enable Bluetooth, and broadcast a query data packet to Bluetooth devices within an effective range; receive query response data packets returned by the Bluetooth devices within the effective range; determine a to-be-paired Bluetooth device from the Bluetooth devices within the effective range based on information in the query response data packets; and send a pairing request to the to-be-paired Bluetooth device.

A person skilled in the art should be aware that in the foregoing one or more examples, functions described in the present invention may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A first Bluetooth device, comprising:
at least one processor; and
a memory coupled to the at least one processor and storing programming instructions that, when executed by the at least one processor, cause the first Bluetooth device to:
detect a movement parameter of the first Bluetooth device;
determine whether the movement parameter meets a preset condition;
in response to determining that the movement parameter meets a preset condition, enable Bluetooth service of the first Bluetooth device, and determine first movement time information of the first Bluetooth device;
broadcast a query data packet within an effective range;
receive at least one query response data packet from the at least one Bluetooth device within the effective range, wherein each of the at least one query response data packet comprises pairing indication information and movement time information, wherein the pairing indication information indicates that the at least one Bluetooth device within the effective range performs Bluetooth pairing by performing a preset movement;

compare the movement time information to the first movement time information;

determine a to-be-paired Bluetooth device whose movement time information has a smallest time difference from the first movement time information, from the at least one Bluetooth device within the effective range; and send a pairing request to the to-be-paired Bluetooth device, to pair with the to-be-paired Bluetooth device.

2. The first Bluetooth device according to claim 1, wherein each of the at least one query response data packet comprises received signal strength indicator (RSSI) information, wherein the memory further stores instructions that, when executed by the at least one processor, cause the first Bluetooth device to:

determine, from the at least one Bluetooth device within the effective range, a Bluetooth device nearest to the first Bluetooth device as the to-be-paired Bluetooth device based on the RSSI information.

3. The first Bluetooth device according to claim 1, wherein each of the at least one query response data packet comprises received signal strength indicator (RSSI) information, wherein the memory further stores instructions that, when executed by the at least one processor, cause the first Bluetooth device to:

determine, from the at least one Bluetooth device within the effective range, a Bluetooth device within a preset distance from the first Bluetooth device as the to-be-paired Bluetooth device based on the RSSI information.

4. The first Bluetooth device according to claim 1, wherein the movement parameter is any one or any combination of: a moving track, a movement speed, or a movement acceleration.

5. The first Bluetooth device according to claim 4, wherein detecting, by the first Bluetooth device, whether the movement parameter meets the preset condition comprises:

detecting, by the first Bluetooth device, whether the movement acceleration is greater than a preset acceleration of the first Bluetooth device.

6. The first Bluetooth device according to claim 4, wherein detecting, by the first Bluetooth device, whether the movement parameter meets the preset condition comprises:

detecting, by the first Bluetooth device, whether the moving track matches a preset track of the first Bluetooth device.

7. The first Bluetooth device according to claim 4, wherein detecting, by the first Bluetooth device, whether the movement parameter meets the preset condition comprises:

detecting, by the first Bluetooth device, whether the movement speed is greater than a preset speed of the first Bluetooth device.

8. A Bluetooth pairing method, comprising:

detecting, by a first Bluetooth device, a movement parameter;

determining, by the first Bluetooth device, whether the movement parameter meets a preset condition;

in response to determining that the movement parameter meets a preset condition, enabling, by the first Bluetooth device, Bluetooth service of the first Bluetooth device, and determining, by the first Bluetooth device, first movement time information of the first Bluetooth device;

broadcasting, by the first Bluetooth device, a query data packet within an effective range;

receiving, by the first Bluetooth device, at least one query response data packet from the at least one Bluetooth device within the effective range, wherein each of the at least one query response data packet comprises pairing indication information and movement time information, and wherein the pairing indication information indicates that the at least one Bluetooth device within the effective range performs Bluetooth pairing by performing a preset movement;

comparing, by the first Bluetooth device, the movement time information to the first movement time information;

determining, by the first Bluetooth device, a to-be-paired Bluetooth device whose movement time information has a smallest time difference from the first movement time information, from the at least one Bluetooth device within the effective range; and sending, by the first Bluetooth device, a pairing request to the to-be-paired Bluetooth device, to pair with the to-be-paired Bluetooth device.

9. The Bluetooth pairing method according to claim 8, wherein each of the at least one query response data packet comprises received signal strength indicator (RSSI) information, the method further comprising:

determining, from the at least one Bluetooth device within the effective range, a Bluetooth device nearest to the first Bluetooth device as the to-be-paired Bluetooth device based on the RSSI information.

10. The Bluetooth pairing method according to claim 8, wherein each of the at least one query response data packet comprises received signal strength indicator (RSSI) information, the method further comprising:

determining, from the at least one Bluetooth device within the effective range, a Bluetooth device within a preset distance from the first Bluetooth device as the to-be-paired Bluetooth device based on the RSSI information.

11. The Bluetooth pairing method according to claim 8, wherein the movement parameter is any one or any combination of: a moving track, a movement speed, or a movement acceleration.

12. The Bluetooth pairing method according to claim 11, wherein detecting, by the first Bluetooth device, whether the movement parameter meets the preset condition comprises:

detecting, by the first Bluetooth device, whether the movement acceleration is greater than a preset acceleration of the first Bluetooth device.

13. The Bluetooth pairing method according to claim 11, wherein detecting, by the first Bluetooth device, whether the movement parameter meets the preset condition comprises:

detecting, by the first Bluetooth device, whether the moving track matches a preset track of the first Bluetooth device.

14. The Bluetooth pairing method according to claim 11, wherein detecting, by the first Bluetooth device, whether the movement parameter meets the preset condition comprises:

detecting, by the first Bluetooth device, whether the movement speed is greater than a preset speed of the first Bluetooth device.

15. A computer program product for Bluetooth pairing, the computer program product being embodied in a non-transitory computer readable medium and comprising computer instructions for:

detecting, by a first Bluetooth device, a movement parameter;

determining, by the first Bluetooth device, whether the movement parameter meets a preset condition;

in response to determining that the movement parameter meets a preset condition, enabling, by the first Bluetooth device, Bluetooth service of the first Bluetooth device, and determining, by the first Bluetooth device, first movement time information of the first Bluetooth device;

broadcasting, by the first Bluetooth device, a query data packet within an effective range;

receiving, by the first Bluetooth device, at least one query response data packet from the at least one Bluetooth device within the effective range, wherein each of the at least one query response data packet comprises pairing indication information and movement time information, and wherein the pairing indication information indicates that the at least one Bluetooth device within the effective range performs Bluetooth pairing by performing a preset movement;

comparing, by the first Bluetooth device, the movement time information to the first movement time information;

determining, by the first Bluetooth device, a to-be-paired Bluetooth device whose movement time information has a smallest time difference from the first movement time information, from the at least one Bluetooth device within the effective range; and sending, by the first Bluetooth device, a pairing request to the to-be-paired Bluetooth device, to pair with the to-be-paired Bluetooth device.

16. The computer program product according to claim 15, wherein each of the at least one query response data packet comprises received signal strength indicator (RSSI) information, the computer program product further comprises computer instructions for:

determining, from the at least one Bluetooth device within the effective range, a Bluetooth device nearest to the first Bluetooth device as the to-be-paired Bluetooth device based on the RSSI information.

17. The computer program product according to claim 15, wherein each of the at least one query response data packet comprises received signal strength indicator (RSSI) information, the computer program product further comprises computer instructions for:

determining, from the at least one Bluetooth device within the effective range, a Bluetooth device within a preset distance from the first Bluetooth device as the to-be-paired Bluetooth device based on the RSSI information.

18. The computer program product according to claim 15, wherein the movement parameter is any one or any combination of: a moving track, a movement speed, or a movement acceleration.

19. The computer program product according to claim 18, wherein detecting, by the first Bluetooth device, whether the movement parameter meets the preset condition comprises:

detecting, by the first Bluetooth device, whether the movement acceleration is greater than a preset acceleration of the first Bluetooth device.

20. The computer program product according to claim 18, wherein detecting, by the first Bluetooth device, whether the movement parameter meets the preset condition comprises:

detecting, by the first Bluetooth device, whether the moving track matches a preset track of the first Bluetooth device.

* * * * *